(12) United States Patent
Bjorklund et al.

(10) Patent No.: US 10,368,071 B2
(45) Date of Patent: Jul. 30, 2019

(54) ENCODING DATA ARRAYS

(71) Applicant: Arm Limited, Cambridge (GB)

(72) Inventors: John Nils Andreas Bjorklund, Lund (SE); Sven Ola Johannes Hugosson, Lund (SE)

(73) Assignee: Arm Limited, Cambridge, MA (US)

( * ) Notice: Subject to any disclaimer, the term of this patent is extended or adjusted under 35 U.S.C. 154(b) by 0 days.

(21) Appl. No.: 15/803,482

(22) Filed: Nov. 3, 2017

(65) Prior Publication Data

US 2019/0141324 A1    May 9, 2019

(51) Int. Cl.
*H04N 19/124* (2014.01)
*H04N 19/132* (2014.01)
*H04N 19/176* (2014.01)
*H04N 19/186* (2014.01)

(52) U.S. Cl.
CPC ......... *H04N 19/124* (2014.11); *H04N 19/176* (2014.11); *H04N 19/186* (2014.11); *H04N 19/132* (2014.11)

(58) Field of Classification Search
CPC .. H04N 19/124; H04N 19/176; H04N 19/186; H04N 19/132
See application file for complete search history.

(56) References Cited

U.S. PATENT DOCUMENTS

| | | | | |
|---|---|---|---|---|
| 6,208,693 B1 * | 3/2001 | Chen | ........................ | H04N 9/75 348/E9.056 |
| 8,681,873 B2 * | 3/2014 | Bivolarsky | .......... | H04N 19/107 375/240.21 |
| 9,078,009 B2 * | 7/2015 | Bivolarsky | .......... | H04N 19/105 |
| 9,245,356 B2 * | 1/2016 | Shibahara | ............. | H04N 19/463 |
| 9,313,526 B2 * | 4/2016 | Bivolarsky | .......... | H04N 19/105 |
| 9,609,342 B2 * | 3/2017 | Bivolarsky | .......... | H04N 19/105 |
| 9,819,358 B2 * | 11/2017 | Vafin | ................... | H03M 7/4018 |
| 2003/0031256 A1 * | 2/2003 | Youn | ..................... | G06F 17/147 375/240.15 |
| 2003/0031259 A1 * | 2/2003 | Youn | .................. | H03H 21/0012 375/240.24 |
| 2007/0120967 A1 * | 5/2007 | Eshkoli | .................. | H04N 7/147 348/14.08 |

(Continued)

OTHER PUBLICATIONS

"High Efficiency Video Coding (HEVC)," Fraunhofer Heinrich Hertz Institute, 2016, available at: https://hevc.hhi.fraunhofer.de/.

*Primary Examiner* — Jayanti K Patel
*Assistant Examiner* — Irfan Habib
(74) *Attorney, Agent, or Firm* — Vierra Magen Marcus LLP

(57) ABSTRACT

When encoding an array of quantized frequency domain coefficients for the chrominance data values for a block of data elements being encoded, it is determined whether the encoding of the frequency domain coefficients for the luminance data for the block being considered was indicated as to be omitted. If so, it is then determined whether the non-zero coefficients in the array of quantized chrominance data value frequency domain coefficients for the block are few in number and/or small in size. If the number and/or size of the non-zero quantized chrominance value frequency domain coefficients is determined to be sufficiently few and/or small, then the encoding of the quantized frequency domain coefficients for the chrominance data for the block is omitted.

19 Claims, 6 Drawing Sheets

(56) References Cited

U.S. PATENT DOCUMENTS

| | | | | |
|---|---|---|---|---|
| 2007/0217511 A1* | 9/2007 | Li | H04N 19/56 | 375/240.16 |
| 2008/0075171 A1* | 3/2008 | Suzuki | H04N 19/176 | 375/240.16 |
| 2008/0095230 A1* | 4/2008 | Hannuksela | H04N 21/23614 | 375/240.02 |
| 2008/0123750 A1* | 5/2008 | Bronstein | H04N 19/17 | 375/240.24 |
| 2008/0240247 A1* | 10/2008 | Lee | H04N 19/52 | 375/240.16 |
| 2008/0273810 A1* | 11/2008 | Subramania | H04N 19/176 | 382/251 |
| 2009/0060362 A1* | 3/2009 | Harmanci | H04N 19/139 | 382/238 |
| 2009/0180538 A1* | 7/2009 | Visharam | H04N 19/176 | 375/240.15 |
| 2009/0225830 A1* | 9/2009 | He | H04N 19/103 | 375/240.03 |
| 2009/0245587 A1* | 10/2009 | Holcomb | H04N 19/176 | 382/108 |
| 2010/0310065 A1* | 12/2010 | Chang | H04N 7/1675 | 380/28 |
| 2011/0123101 A1* | 5/2011 | Lipowezki | G01J 1/18 | 382/159 |
| 2011/0142366 A1* | 6/2011 | Young | G06T 3/4069 | 382/274 |
| 2011/0150331 A1* | 6/2011 | Young | G06T 3/4015 | 382/167 |
| 2011/0206118 A1* | 8/2011 | Bivolarsky | H04N 19/105 | 375/240.12 |
| 2011/0206119 A1* | 8/2011 | Bivolarsky | H04N 19/105 | 375/240.12 |
| 2012/0182454 A1* | 7/2012 | Schwartz | H04N 9/045 | 348/273 |
| 2013/0034149 A1* | 2/2013 | Karuchula | H04N 11/04 | 375/240.03 |
| 2013/0051473 A1* | 2/2013 | Chen | H04N 19/533 | 375/240.16 |
| 2013/0294689 A1* | 11/2013 | Jia | H04N 19/169 | 382/166 |
| 2014/0112394 A1* | 4/2014 | Sullivan | H04N 19/46 | 375/240.26 |
| 2014/0233638 A1* | 8/2014 | Tu | H04N 19/176 | 375/240.03 |
| 2014/0254682 A1* | 9/2014 | Chen | H04N 19/597 | 375/240.16 |
| 2014/0369426 A1* | 12/2014 | Li | H04N 19/46 | 375/240.29 |
| 2015/0043641 A1* | 2/2015 | Gamei | H04N 19/122 | 375/240.12 |
| 2015/0248748 A1* | 9/2015 | Nagaraja | G06T 5/002 | 382/262 |
| 2016/0100189 A1* | 4/2016 | Pang | H04N 19/593 | 375/240.13 |

\* cited by examiner

ENCODING DATA ARRAYS

BACKGROUND

The technology described herein relates to a method of and apparatus for encoding data arrays, and in particular for encoding streams of data arrays, such as in the case of encoding frames of video, e.g., for display.

It is common to encode a stream of arrays of data elements, such as arrays of image data values (e.g. frames of video for display), so as to compress the data in order to reduce bandwidth and memory consumption. This is particularly desirable in data processing apparatus, e.g. of portable devices, where processing resources and power may be limited.

In order to encode a stream of arrays of data elements, each array of data elements is often divided into smaller "source" blocks of data elements and encoded on a block by block basis based on the difference between the source block and a "reference" block of data elements (which may be a predicted block of data elements) that is derived from one or more arrays of the stream of arrays.

The particular encoding options to use when encoding an array typically vary from region to region of the array. For example, the particular size of the source block(s), the particular way in which the reference block(s) are derived, etc., may be different for different regions of the array.

The particular encoding options to use when encoding an array are often selected by calculating cost values for various different sets of encoding options for a region and then selecting one or more particular sets of encoding options to use when encoding that region of the array that have an acceptably low cost value (e.g. using a so-called "Rate Distortion Optimisation" (RDO) process).

FIG. 1 illustrates this process 100 of selecting an encoding option to use for a source block of data elements of a data array, encoding the source block using the selected encoding option, and, subsequently, decoding the encoded block for use.

As shown in FIG. 1, for a given source, e.g. video, frame to be encoded, a set of encoding options to consider for a region of the source frame is selected (step 102).

A cost value is then determined for that set of encoding options (step 104). This is repeated for each set of encoding options to be considered (steps 106 and 108).

Once all of the sets of encoding options have been considered then one or more of the sets of encoded options is selected as the encoding option to use for the source frame blocks (step 110) and each of the one or more source blocks for the region are then encoded in accordance with the selected set of encoding options for that source block (step 112).

The encoded source blocks may then, e.g., be written out to memory (step 114) and subsequently read and decoded for output (e.g. display) (steps 116, 118 and 120).

As discussed above, one element of the above encoding process is to assess and compare the cost of different encoding possibilities for blocks of a source frame to be encoded. This is typically done using an RDO process.

An example RDO process 500 for calculating a cost value for one particular set of encoding options under consideration is shown in FIG. 2.

The RDO process 500 of FIG. 2 initially comprises subtracting (−) the data elements of a particular source block (Src) for a region from the data elements of a particular reference (predicted) block (Pred) to generate a set of difference values (a set of "residuals").

The reference (predicted) block (Pred) may be another block within the source frame itself (i.e. using "intra" mode encoding), or it may be a block formed from one or more other frames of the sequence of frames, i.e. using "inter" mode encoding. In the latter case a motion estimation process may be used to search within one or more reference frames for one or more suitable candidate reference blocks to consider using when encoding a source block. Such a candidate reference block can be derived by using a motion vector that describes how a particular block of a particular frame is mapped (e.g. by translation, rotation and/or scaling) to that candidate reference block. The appropriate reference (predicted) block to use may be selected using any suitable metric that indicates the similarity or difference between the source block and the potential reference block in question, such as a sum of absolute differences (SAD) value.

A forward discrete cosine transformation process (F-DCT) is then applied to the set of difference values (residuals) to generate a set of frequency domain coefficients. A quantisation process (Q) is then applied to the set of frequency domain coefficients to generate a set of quantised frequency domain coefficients.

These steps essentially replicate the steps that would be applied prior to encoding the frequency domain coefficients for the source block, for example using entropy encoding. Thus, at this point, a bit count process (Bitcount) can be applied to the set of quantised frequency domain coefficients to determine a bit count cost that would be incurred when encoding the source block in accordance with the particular set of encoding options under consideration.

The bit count process may also take account of other bit costs, such as a measure of the bits needed to specify the prediction type being used, if desired.

A de-quantisation process (DQ) is then applied to the set of quantised frequency domain coefficients to generate a set of de-quantised coefficients. An inverse discrete cosine transformation process (I-DCT) is then applied to the set of de-quantised frequency domain coefficients to generate a set of reconstructed difference values. The set of reconstructed difference values is then added (+) to the reference (predicted) block to generate a reconstructed source block.

These steps essentially replicate the steps that would be applied so as to reconstruct the source block subsequent to decoding the encoded frequency domain coefficients for the source block. Thus, at this point, the data elements of the reconstructed source block are subtracted (−) from the data elements of the original source block to generate a set of error values and a sum-square distortion measuring process ($\Sigma x^2$) is then applied to the set of error values to determine the total amount of distortion that would be introduced when encoding and then decoding the source block in accordance with the particular set of encoding options under consideration.

A cost value process (Cost) is then performed to determine an overall cost value for the particular set of encoding options from the bit count value and the distortion value.

As shown in FIG. 1, the RDO process of FIG. 2 is repeated in accordance with various different sets of encoding options for the region (e.g. different source block sizes, differently derived reference blocks, etc.) to produce a cost value for each of those different sets of encoding options. One or more sets of encoding options to use when encoding the region of the array are then selected based on the cost values for the different sets of encoding options.

(The RDO process is repeated across the array of data elements to select the sets of encoding options to use when encoding the remaining regions of the array of data elements.)

As discussed above, one aspect of the encoding of an array of, e.g. video, data according to many encoding standards is the derivation and encoding of a set of frequency domain coefficients representing, in the frequency domain, the differences (the residuals) between a block being encoded and a reference (e.g. predicted) block.

Many, e.g. video, encoding arrangements and standards support the option of not encoding any (quantized) frequency domain coefficients at all for a source block being encoded (such that the block will just rely on and use the reference (e.g. the predicted) block to represent that part of the array (frame) being encoded at the decoder (in the decoded frame).

The decision to omit the encoding of (quantized) frequency domain coefficients for a block being encoded may be based on, for example, a comparison of the increased image distortion if the encoding of the (quantized) frequency domain coefficients block is omitted to the decrease in bits that will be provided by not encoding the frequency domain coefficients (with the encoding of the (quantized) frequency domain coefficients for the block being omitted if the gains are determined to outweigh the losses). A block for which the encoding of the (quantized) frequency domain coefficients has been omitted is usually indicated as such in the encoded bit stream representing the data array (e.g. video frame), such that the decoder can identify the presence of such a block and reuse the reference (e.g. predicted) block for that block (without adding any differences or residuals to it) accordingly.

Video data (video frames) is often provided as data in the "YUV" colour space. YUV colours are described by a "luma" (Y) value representing the luminance or brightness of the colour, and two "chroma" values (U and V) representing the chrominance information of the colour.

In the case of "YUV" video data, for example, for respective data elements within the data array representing, e.g., the video frame, appropriate luma (Y) and chroma (U and V) values will be stored. In such arrangements, the luminance part ("luma") is typically encoded separately from the two chrominance parts ("chroma"). In particular, the differences between the reference (e.g. predicted) block and the source block (the "residuals") are typically encoded separately for the chroma and luma parts of the video data.

When determining the encoding options to use for encoding a frame YUV video data, it is possible to consider only the luma data elements, since the luma data elements alone can be used, for example, to establish any motion that is to be used for a motion estimation process, and, equally, the results of the motion estimation (the prediction) determined from the luma data elements can usually be satisfactorily used for the chroma parts of the frame as well. Thus it is, for example, possible to perform the motion estimation process using the luma data for the video frame only, and to apply the results of that luma processing to the chroma parts of the video frame, without actually testing the chroma parts of the video frame themselves. This can then allow, for example, motion estimation processing of the chroma data elements to be omitted, thereby saving both execution time and power.

In the case where the motion estimation process only considers the luma part of a YUV data array (e.g. video frame), then that motion estimation will accordingly identify blocks for which the encoding of the (quantized) frequency domain coefficients for the luma part can be omitted (i.e. for which there will be no luma quantized frequency domain coefficients for the differences (residuals) between the reference block and the source block encoded).

While it would be possible in such arrangements to, whenever the encoding of the (quantized) frequency domain coefficients for the luma block has been omitted, also correspondingly omit the encoding of the quantized frequency domain residual (differences) coefficients for the chroma parts of the block in question as well, the Applicants have recognised that that can lead to and result in unwanted colour artefacts in the reconstructed image. Thus, omitting the encoding of the (quantized) frequency domain coefficients for blocks for the chroma parts of a YUV data array being encoded based only on a motion estimation analysis of the luma parts of the data array can lead to undesirable distortions and artefacts in the reconstructed data array.

On the other hand, the Applicants have recognised that to perform a full analysis to determine when the encoding of the (quantized) frequency domain coefficients for the chroma parts of a block of a YUV data array to be encoded can be omitted would increase the processing burden on the encoding process, and in particular, potentially negate any advantage to be gained by considering only the luma part of the data array when selecting the encoding option to use for blocks of a YUV data array to be encoded.

The Applicants accordingly believe that there remains scope for improved techniques for encoding YUV data arrays, such as frames of video data that are encoded in a YUV format.

BRIEF DESCRIPTION OF THE DRAWINGS

Various embodiments of the technology described herein will now be described by way of example only and with reference to the accompanying drawings, in which.

DETAILED DESCRIPTION

Figure 1:
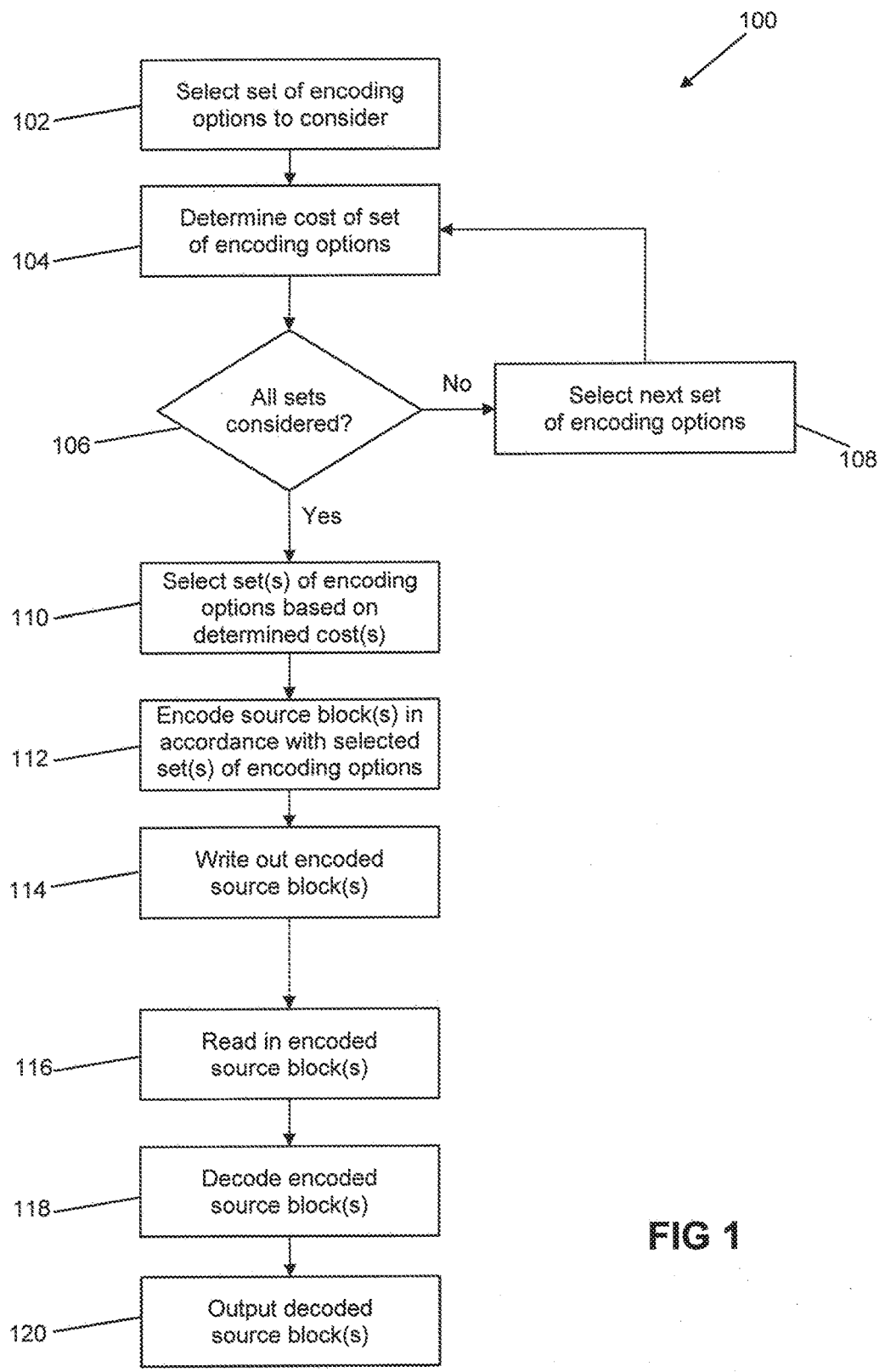
FIG. 1 shows a method of selecting and using a set of encoding options based on a cost value.

A first embodiment of the technology described herein comprises a method of encoding an array of data elements of a stream of arrays of data elements, in which the array of data elements is to be encoded as respective sets of luminance and chrominance data values, and is to be encoded as respective blocks of data elements making up the array of data elements, the method comprising:

when encoding the chrominance data values for a source block of data elements of a data array that is to be encoded:

generating an array of chrominance difference values that represents the difference between the chrominance values of the source block of data elements of the array of data elements being encoded and the chrominance values for a reference block of data elements derived from the chrominance values of one or more arrays of data elements in the stream of arrays of data elements;

generating an array of chrominance value frequency domain coefficients for the array of chrominance difference values by applying a forward transformation process to the array of chrominance difference values;

generating an array of quantized chrominance value frequency domain coefficients by applying a quantization process to the array of chrominance value frequency domain coefficients;

determining whether the encoding of the quantized frequency domain coefficients for the luma data values for the block of the array of data elements being encoded is indicated as to be omitted; and when it is determined that the encoding of the quantized frequency domain coefficients for the luma data for the block of data elements of the data array being encoded is indicated as to be omitted:

determining whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and when it is determined based on the property or properties of the determined quantized chrominance value frequency domain coefficients to omit the encoding of the quantized chrominance value frequency domain coefficients in the output encoded bit stream representing the array of data elements, not including data for the array of quantized chrominance value frequency domain coefficients in the output bit stream representing the encoded array of data elements.

A second embodiment of the technology described herein comprises an apparatus for encoding an array of data elements of a stream of arrays of data elements, in which the array of data elements is to be encoded as respective sets of luminance and chrominance data values, and is to be encoded as respective blocks of data elements making up the array of data elements, the apparatus comprising:

difference value generating circuitry operable to generate an array of chrominance difference values that represents the difference between the chrominance values of a source block of data elements of an array of data elements being encoded and the chrominance values for a reference block of data elements derived from the chrominance values of one or more arrays of data elements in the stream of arrays of data elements;

frequency domain coefficient generating circuitry operable to generate an array of chrominance value frequency domain coefficients for the array of chrominance difference values by applying a forward transformation process to the array of chrominance difference values;

quantizing circuitry operable to generate an array of quantized chrominance value frequency domain coefficients by applying a quantization process to the array of chrominance value frequency domain coefficients;

encoding determination circuitry operable to:
determine whether the encoding of the quantized frequency domain coefficients for the luma data values for the block of the array of data elements being encoded is indicated as to be omitted; and to, when it is determined that the encoding of the quantized frequency domain coefficients for the luma data for the block of data elements of the data array being encoded is indicated as to be omitted:

determine whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and to, when it is determined based on the property or properties of the determined quantized chrominance value frequency domain coefficients to omit the encoding of the quantized chrominance value frequency domain coefficients in the output encoded bit stream representing the array of data elements, not include data for the array of quantized chrominance value frequency domain coefficients in the output bit stream representing the encoded array of data elements.

The technology described herein relates to the encoding of arrays of data elements, such as video frames, that are represented in the YUV colour space. In the technology described herein, the luma and chroma parts of the data array are encoded separately, and when encoding the chroma part of the data array, once the quantized frequency domain coefficients for the chroma part of the data array for a block of the data array being encoded have been determined, a decision is then made as to whether the inclusion of the data representing the determined quantized frequency domain coefficients for the chroma part of the block should be included in the output bit stream representing the encoded array of data elements, based on whether the encoding of the quantized frequency domain coefficients for the luma part of the block of data elements in question has been indicated to be omitted and one or more properties of the determined quantized chroma value frequency domain coefficients.

In other words, rather than simply automatically omitting the encoding of the quantized frequency domain coefficients for the chroma part of a YUV array of data elements in the event that the encoding of the quantized frequency domain coefficients for the corresponding luma part of the array have been indicated as being omitted, an additional check is made based on a property or properties of the determined quantized chroma value frequency domain coefficients before deciding whether or not to omit the encoding of the quantized frequency domain coefficients for the chroma part (data values) of the part (block) of the array of data elements in question.

As will be discussed further below, this can then allow a different "omit" decision to be made for the chroma part of the data array as compared to the luma part of the data array (and on a block-by-block basis), but without the need, for example, to perform a full and/or more sophisticated analysis of the quantized chroma value frequency domain coefficients and their encoding to determine whether to omit the encoding of the quantized chroma value frequency domain coefficients or not. The technology described herein can accordingly provide a mechanism that can facilitate better decision making in the encoding process for determining whether to omit the encoding of the quantised frequency domain coefficients for the chroma part of a YUV array of data elements being encoded, but whilst still using a relatively resource and time efficient process (as compared, for example, to performing a more sophisticated chroma residual frequency domain coefficient analysis for that purpose).

It should be noted here that in the technology described herein, the determination of whether or not to omit the encoding of the quantized frequency domain coefficients for the chroma part (chrominance values) for a block of an array of data elements being encoded is determined during and as part of the operation of actually encoding the array of data elements, and after the quantized chroma value frequency domain coefficients have been determined for the chroma difference values (residuals). The operation in the manner of the technology described herein is thus performed after the encoding option to use for the array of data elements has been selected (using, e.g., and in an embodiment, an RDO process).

In an embodiment, the technology described herein is used in arrangements in which the luma values for the array of data elements are used to determine which of plural possible encoding options to use for the array of data elements (e.g., and in an embodiment, based on and using an RDO process), with the technology described herein then being used when encoding the array of data elements using the so-selected encoding option to determine whether to omit the encoding of the quantized chroma value frequency domain coefficients during the process of actually encoding the array of data elements (e.g. video frame) using the selected encoding options.

In any of the embodiments described herein the arrays of data elements of the stream of arrays may take any desired and suitable form. In embodiments, the arrays of data elements may each correspond to an array of data positions. The arrays of data elements or positions may correspond to all or part of a desired (e.g. image) output, such as a frame (e.g. for display). There may be any desired and suitable correspondence between the data elements or positions and the desired output. Thus, the data elements or positions of the arrays may each correspond to a pixel or pixels of a desired output. The arrays of data elements can be any desired and suitable size or shape in terms of data elements or positions, but are in an embodiment rectangular (including square). The data elements may also have any desired and suitable format, for example that represents image data values (e.g. colour values).

The arrays of data elements in an embodiment comprise respective video frames (images), in an embodiment of a stream (a sequence) of video frames, but other arrangements would be possible if desired.

As discussed above, the technology described herein is particularly concerned with arrays of data elements that are represented in a YUV format, i.e. such that for the array of data elements, there are respective luminance (Y) and chrominance (U and V) data values stored. Thus, in an embodiment, the array of data elements (and the stream of arrays of data elements) comprise array(s) of data elements for which luminance and chrominance data values are stored (i.e. having a YUV format).

In this regard, there may be a set of luminance data values for the array of data elements (e.g. video frame) in question and a (single) set of chrominance data values (comprising both U and V data values) for the array of data elements, or there could be a set of luminance data values and two respective separate sets of chrominance data values (i.e. one set of U values and one set of V values) for the array of data elements (e.g. video frame).

The technology described herein is particularly concerned with the encoding of the chrominance data values for the array of data elements in question, and may be applied to the (single) set of chrominance values that is provided for the set of data elements, or to the respective separate U and V sets of chrominance data values, as appropriate. The set of luminance data values for the array of data elements may be handled in any appropriate and desired manner, e.g. in the normal manner for the encoding scheme (e.g. standard) in question.

In any of the embodiments described herein the source block may take any desired and suitable form. In embodiments, the source block can be any desired and suitable size or shape in terms of data elements or positions, but is in an embodiment rectangular (including square). For example, the source block may be 4×4, 4×8, 8×4, 8×8, 8×16, 16×8, 16×16, 16×32, 32×16, 32×32, 32×64, 64×32, 64×64 etc., data elements or positions in size. In embodiments, the source block may be one of plural blocks that the array of data elements may be divided into for encoding purposes. These plural blocks may be non-overlapping and/or may be similar or different in size or shape. The array of data elements can be any desired and suitable size, shape or configuration in terms of such blocks.

In any of the embodiments described herein the reference (predicted) block may be derived in any desired and suitable way. In embodiments, the reference block may be derived from the same array of data elements as the source block (using an "intra" mode). Alternatively, the reference block may be derived from one or more different arrays of data elements in the stream of arrays (using an "inter" mode). The one or more different arrays may comprise one or more previous arrays of data elements (using a "forwards" mode) and/or one or more subsequent arrays of data elements (using a "backwards" mode). In these embodiments, the reference block may be derived only from one or more previous arrays of data elements or only from one or more subsequent arrays of data elements (using a "uni-directional" mode). Alternatively, the reference block may be derived from both one or more previous arrays of data elements and from one or more subsequent arrays of data elements (using a "bi-directional" mode).

Where the reference block is derived from plural different arrays of data elements, data elements of the plural different arrays may be combined, e.g. averaged. In embodiments, the reference block for the source block may be derived in the same or in a substantially similar manner to another reference block that is derived for another source block that is adjacent to the source block (using a "merge" mode).

The reference block may correspond in size and/or shape (in terms of array elements) to the size and/or shape of the source block.

In any of the embodiments described herein, the arrays of data elements may be provided in any desired and suitable way. Embodiments may comprise generating (at least some or all of) the data elements of the arrays. Embodiments may also or instead comprise reading in (at least some or all of) the data elements of the arrays, e.g. from memory.

The data elements of the arrays may be generated in any desired and suitable way. In embodiments, the data elements of the arrays may be generated by a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processor (a graphics processing pipeline) may be used in order to generate the data elements of the arrays. The graphics processing pipeline may contain any suitable and desired processing stages that a graphics pipeline and processor may contain, such as a vertex shader, a rasterisation stage (a rasteriser), a rendering stage (a renderer), etc., in order to generate the data elements of the arrays.

In any of the embodiments described herein, generating the array of difference values can take any desired and suitable form. In embodiments, generating the array of difference values may comprise subtracting the values of the data elements of the source block respectively from the values of the corresponding (in terms of data position) data elements of the reference block, or vice versa.

In any of the embodiments described herein, the forward transformation process can take any desired and suitable form that generates an array of frequency domain coefficients. In embodiments, the forward transformation process may be substantially linear and/or orthogonal and/or invertible and/or discrete. The forward transformation process may be defined by the particular standard (e.g. HEVC standard) to be used when encoding the array of data elements. The forward transformation process may, for example, be a forward Discrete Cosine Transform (DCT).

The array of difference values may correspond in size and/or shape (in terms of array elements) to the size and/or shape of the source block and/or the reference block. The forward transformation process may comprise applying respective forward transformations to the rows of the array of difference values and then applying respective forward transformations to the columns of the resultant row-transformed array, or vice versa. For example, the forward transformation process may comprise applying respective forward transformations to each and every row of the array of difference values and then to each and every column of the resultant row-transformed array, or vice versa.

In any of the embodiments described herein, the quantisation process can take any desired and suitable form. In embodiments, applying the quantisation process may comprise respectively quantising (e.g. division by a quantisation constant and/or truncating and/or rounding) the frequency domain coefficients of the array of frequency domain coefficients. The quantisation may be defined by the particular standard (e.g. HEVC standard) to be used when encoding the array of data elements.

The array of frequency domain coefficients may correspond in size and/or shape (in terms of array elements) to the size and/or shape of the array of difference values, the source block, and/or the reference block.

The quantisation process may comprise quantising all of the frequency domain coefficients of the array of frequency domain coefficients.

However, in embodiments, applying the quantisation process may comprise quantising only a subset of the array of frequency domain coefficients.

In these embodiments, the subset of frequency domain coefficients that are quantised may be any desired and suitable subset (i.e. some but not all) of the array of frequency domain coefficients. The subset of frequency domain coefficients that are quantised may comprise coefficients that are expected to have a relatively greater influence on the bit count value and/or distortion value than the remaining coefficients that are not quantised. For example, the subset of frequency domain coefficients that are quantised may comprise a subset of relatively lower frequency coefficients of the array of frequency domain coefficients.

In embodiments, the frequency domain coefficients that did not have the quantisation process applied to them may be handled as desired. For example, those frequency domain coefficients may be set to a selected value, such as zero.

Correspondingly, the array of quantized frequency domain coefficients (i.e. the array of frequency domain coefficients after the quantization process has been applied to the array of frequency domain coefficients) may comprise frequency domain coefficients to all of which a quantization process has been applied, or an array of frequency domain coefficients in which some of the coefficients have had a quantization process applied to them, but others of the array of frequency domain coefficients may not have had a quantization process applied to them (which may, accordingly, retain their initial values, or may be set to a selected value, such as zero). (The frequency domain coefficients to which the quantization process has been applied may, accordingly, have a different value to their initial value (with the value being changed by the quantization process).)

The array of quantised coefficients may thus comprise an array of quantised (and, potentially, zeroed) coefficients. The array of quantised (and zeroed) coefficients may, and in an embodiment does, correspond in size and/or shape (in terms of array elements) to the size and/or shape of the array of frequency domain coefficients, the array of difference values, the source block, and/or the reference block.

As discussed above, once the array of quantized chrominance value frequency domain coefficients has been generated, it is then determined whether to actually include information encoding the generated array of quantized chrominance value frequency domain coefficients in the output bit stream representing the encoded array of data elements for the source block in question. As discussed above, this decision is based on two factors, namely whether the encoding of the quantized frequency domain coefficients for the luma data for the block of data elements in question is indicated as to be omitted, and based on a property or properties of the determined quantized chrominance value frequency domain coefficients for the block being encoded.

It should be noted here that although the decision as to whether to include information encoding the generated array of quantized chrominance value frequency domain coefficients in the output bit stream is based on two factors, namely whether the encoding of the quantized frequency domain coefficients for the luma data is indicated to be omitted, and a property or properties of the determined quantized chrominance value frequency domain coefficients for the block being encoded, the two factors can be tested in either order or, indeed, in parallel, as desired.

The (only) criteria is that in order to omit information encoding the generated array of quantized chrominance value frequency domain coefficients in the output bit stream, both factors must be considered and both factors must indicate that the information encoding the generated array of quantized chrominance value frequency domain coefficients should be omitted from the output bit stream.

For the converse situation, it is enough that one of the factors is so as to indicate that information encoding the generated array of quantized chrominance value frequency domain coefficients should be included in the output bit stream, such that if the factors are tested one after another, then if the first factor tested indicates that information encoding the generated array of quantized chrominance value frequency domain coefficients should be included in the output bit stream, there is no need then to continue with any test of the second factor (if desired).

It can be determined that the encoding of the quantized frequency domain coefficients for the luma data for the block of data elements being encoded is indicated as to be omitted in any suitable and desired manner. In an embodiment, this is based on the presence or otherwise of an appropriate indicator, e.g. flag, associated with the luma part for the block of data elements indicating that the encoding of the quantized frequency domain coefficients for the luma data for the block of data elements should be omitted.

As discussed above, in arrangements where the omitting of the encoding of quantized frequency domain coefficients is supported, an appropriate indication of that will usually be provided to the encoder (and correspondingly to the decoder). As such, the coefficients "omission" indication for the luma data for the block of data elements that is provided to the encoder can also be used when encoding the chroma data for the block of data elements to identify that the encoding of the quantized frequency domain coefficients for the luma data for the block of data elements is to be omitted.

The indication that the encoding of the quantized frequency domain coefficients is to be omitted for the luma part of the block could be indicated, for example, by the presence of a flag or other indication indicating that "no coefficients" are to be encoded for the luma part of the block, and/or a flag or other indication that indicates also that a motion vector is not to be encoded for the luma part of the block (which in many encoding standards then inherently means that there will be no frequency domain coefficients encoded either). For example, in the HEVC standard a block may be indicated as being "skipped" which means that there is no motion vector encoded (but rather the motion vector should be inherited from a spatial or temporal neighbour), but there are also flags for signalling that no coefficients have been encoded, even in the case where a motion vector has been encoded. Either of these indications (or any equivalent indication that indicates that the encoding of the frequency domain coefficients is to be omitted for the luma part of the block) can be used to identify that the encoding of the frequency domain coefficients for the luminance data for the block is to be omitted.

(The technology described herein will still be advantageous even in the situation where a block still has a motion vector encoded for it, as avoiding encoding the frequency domain coefficients will reduce the bit rate even in that situation.)

Other arrangements would, of course, be possible.

The property or properties of the determined quantized chroma value frequency domain coefficients for the block of the array of data elements being encoded that are used to determine whether to encode the quantized chroma value frequency domain coefficients in the output bit stream encoding the array of data elements can be any suitable and desired property or properties of the determined quantized chroma value frequency domain coefficients.

In an embodiment, the property or properties is a property or properties that is representative and/or indicative of the relative significance of the quantized chroma value frequency domain coefficients (e.g., and in an embodiment, so as to give a measure or indication of the relative significance of the determined quantized chroma value frequency domain coefficients and the effect that omitting (or not) those coefficients for use when reconstructing the encoded block of the array of data elements will have on the reconstruction of the block in the decoder).

In an embodiment, the property of the determined quantized chroma value frequency domain coefficients that is used comprises a measure of the size of the determined quantized chroma value frequency domain coefficients. The size (the value) of the determined quantized chroma value frequency domain coefficients can be considered and represented in any suitable manner in this regard, such as, for example, by considering the size (the value) of the largest absolute determined quantized chroma value frequency domain coefficient for the block being encoded, and/or the sum of the absolute values of the determined quantized chroma value frequency domain coefficients for the block being encoded. In an embodiment, the sum of the absolute coefficient values is used as the property that is considered.

It would also or instead be possible to consider the number of non-zero quantized chroma value frequency domain coefficients that have been determined for the block being encoded. Thus, in an embodiment, the number of non-zero quantized chroma value frequency domain coefficients that are determined for a block being encoded are used as the property of the determined quantized chroma value frequency domain coefficients that is considered for the purpose of determining whether or not to omit the encoding of those coefficients for the block.

Thus, in one embodiment, a measure of the size of the determined quantized chroma value frequency domain coefficients is used as the property of those coefficients that is considered. In another embodiment, the number of non-zero quantized chroma value frequency domain coefficients that is determined for the block is used as the property of those coefficients that is used for the decision making process. In another embodiment, both a measure of the size of, and the number of, non-zero quantized chroma value frequency domain coefficients are used as the properties of those coefficients for the purposes of determining whether to omit the encoding of those coefficients or not.

The property or properties of the determined quantized chroma value frequency domain coefficients for the block being encoded can be used to determine whether or not to omit the encoding of those coefficients in any suitable and desired manner. In an embodiment, the value of the property or properties in question (e.g. the size of the coefficients and/or the number of non-zero coefficients) is compared to a threshold value, with the encoding of the coefficients being omitted or not in dependence on the result of comparison. For example, if the number of non-zero coefficients is greater than a threshold value, then encoding of those coefficients is not omitted (and vice-versa). Correspondingly, if the size of the determined coefficients is greater than a threshold value, then encoding of the coefficients is not omitted (and vice-versa).

Other arrangements would, of course, be possible.

The arrangement could use a fixed criteria (e.g. threshold value) for assessing whether the property or properties of the determined quantized chroma value frequency domain coefficients should be interpreted as determining that encoding of those coefficients could be omitted. However, in an embodiment, the decision operation (e.g. the "omission" threshold) is dependent on and takes account of one or more particular, in an embodiment selected, in an embodiment predetermined, criteria, such as, and in an embodiment, one or more of, and in an embodiment both of: the size of the block being encoded; and a "quality" measure for the encoding being performed (which quality measure may, e.g., and in an embodiment, be an overall quantization parameter (qp) that has been set or determined for the encoding of the data array in question).

Thus, in an embodiment, the decision operation for determining based on the property or properties of the determined quantized chroma value frequency domain coefficients whether to encode the quantized chroma value frequency domain coefficients in the output bit stream (the criteria for that decision) can be, and is in an embodiment, varied in use, and in particular in dependence on and based on one or more parameters for the encoding of the data array, such as, and in an embodiment, the size of the block being encoded, and/or a "quality" measure for the encoding being performed. Thus, in an embodiment, different decision criteria may be, and are in an embodiment, used for different blocks of a data array being encoded, e.g., and in an embodiment, dependent on a property or properties of the blocks and/or their encoding.

Correspondingly, in an embodiment, the, e.g. threshold, that is used to determine whether to omit the encoding of the quantized chroma value frequency domain coefficients or not is based on (and varies dependent on) one or both of the size of the block being encoded and a quality parameter for the block being encoded.

The decision operation, e.g. threshold, can be varied based on the property of the block being encoded and/or of the encoding in any suitable and desired manner. In general, larger blocks and poorer (lower) encoding quality should be configured to make the omission of the encoding of the (quantized) frequency domain coefficients for the chrominance data values more likely (and vice-versa).

Thus, in an embodiment, the number of non-zero coefficients that are allowed to be present in a block before determining that those quantized coefficients should be encoded in the output bit stream increases as the block size increases. Correspondingly, the number of non-zero coefficients that are allowed to be present in a block before determining that those quantized coefficients should be encoded in the output bit stream increases as the desired encoding quality decreases. Thus, any threshold number of non-zero quantized frequency domain coefficients that must be reached to trigger the inclusion of (the encoding of) the quantized chroma value frequency domain coefficients in the output bit stream is in an embodiment set to be larger for larger block sizes and for lower encoding quality.

Correspondingly, the higher the desired quality for the encoding, and the smaller the block size, the lower the threshold for triggering the inclusion of the encoding of the quantized chroma value frequency domain coefficients in the output bit stream. Thus, in an embodiment, the number of non-zero coefficients that are allowed to be present in a block before determining that those quantized coefficients should be encoded in the output bit stream decreases as the (desired) encoding quality increases, and as the block size gets smaller. Thus, any threshold number of non-zero quantized frequency domain coefficients that must be reached to trigger the inclusion of (the encoding of) the quantized chroma value frequency domain coefficients in the output bit stream is in an embodiment set to be smaller for higher quality encoding and for smaller blocks.

Correspondingly, in an embodiment, the size of the non-zero coefficients that are allowed to be present in a block before determining that those quantized coefficients should be encoded in the output bit stream increases as the block size increases. Correspondingly, the size of the non-zero coefficients that are allowed to be present in a block before determining that those quantized coefficients should be encoded in the output bit stream increases as the desired encoding quality decreases. Thus, any threshold size for the non-zero quantized frequency domain coefficients that must be reached to trigger the inclusion of (the encoding of) the quantized chroma value frequency domain coefficients in the output bit stream is in an embodiment set to be larger for larger block sizes and for lower encoding quality.

Correspondingly, in an embodiment, the size of the non-zero coefficients that are allowed to be present in a block before determining that those quantized coefficients should be encoded in the output bit stream decreases as the (desired) encoding quality increases, and as the block size gets smaller. Thus, any threshold size for the non-zero quantized frequency domain coefficients that must be reached to trigger the inclusion of (the encoding of) the quantized chroma value frequency domain coefficients in the output bit stream is in an embodiment set to be smaller for higher quality encoding and for smaller blocks.

When it is determined that the encoding of the quantized frequency domain coefficients for the luma data for the block of data elements is indicated to be omitted and the property or properties of the determined quantized chrominance value frequency domain coefficients meet the criteria for the encoding of the quantized chrominance value frequency domain coefficients in the output encoded bit stream to be omitted, then data for the array of quantized chrominance frequency domain coefficients for the block of data elements being considered is not included in (is omitted from) the output bit stream representing the array of data elements.

The encoding of the quantized frequency domain coefficients for the chrominance data can be omitted from the output bit stream in any suitable and desired manner. In an embodiment, this is done by setting the values of all the quantized frequency domain coefficients for the block being encoded to zero. This will then have the effect of causing the encoder to not include any data relating to the quantized frequency domain coefficients in the output encoded bit stream (since the values will all be zero, and so there will be no data to include for those coefficients).

In an embodiment, in this case, an indication (e.g. a flag, e.g. of the type discussed above in relation to the luma data) to indicate that the encoding of the quantized chrominance value frequency domain coefficients for the block of data elements in question has been omitted in the output bit stream is included in or with the output bit stream, so as to indicate to a decoder that the encoding of the quantized chrominance value frequency domain coefficients for the block of data elements in question has been omitted (is not present in the output encoded data representing the array of data elements) (so that the decoder can then, e.g., reproduce the chrominance values for the block of data elements in question using the indicated reference (e.g. predicted) block alone, without applying any differences or (residuals) to that reference block).

Again, the indication that frequency domain coefficients for the chrominance data have been omitted from the encoded bit stream could be an indication that indicates that alone, or be an indication that indicates that other data, such as a motion vector, has also been omitted from the encoded bit stream, as desired (and as appropriate).

The above discusses the situation where it is determined to omit the data for the array of quantized chrominance value frequency domain coefficients for the block of data elements in the output bit stream. On the other hand, if it is not determined to omit that data from the output bit stream, then data for (and representing) the array of quantized chrominance value frequency domain coefficients should be, and is in an embodiment, included in the output bit stream representing the encoded array of data elements.

Thus, in the event that it is determined that the encoding of the quantized frequency domain coefficients for the luma data for the block of data elements being encoded is not indicated as to be omitted, then data for the array of quantized chrominance value frequency domain coefficients should be, and is in an embodiment, included in the output bit stream representing the encoded array of data elements.

Correspondingly, even when it is determined that the encoding of the quantized frequency domain coefficients for the luma data for the block of data elements is indicated to be omitted, if (when) it is then determined based on the property or properties of the determined quantized chrominance value frequency domain coefficients that the encoding of the quantized chrominance value frequency domain coefficients should nonetheless not be omitted in the output encoded bit stream representing the array of data elements, then again data for the array of quantized chrominance value frequency domain coefficients should be, and is in an embodiment, included in the output bit stream representing the encoded array of data elements.

Thus, in an embodiment, the method of the technology described herein comprises (and the apparatus is correspondingly configured to):

when it is determined that the encoding of the quantized frequency domain coefficients for the luma data for the block of data elements of the data array being encoded is not (is other than) indicated as to be omitted, including data for the array of quantized chrominance value frequency domain coefficients for the block of data elements in the output bit stream representing the encoded array of data elements.

Correspondingly, the method of the technology described herein in an embodiment comprises (and the apparatus is correspondingly configured to):

when it is determined that the encoding of the quantized frequency domain coefficients for the luma data for the block of data elements of the data array being encoded is indicated as to be omitted:

determining whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and when it is determined based on the property or properties of the determined quantized chrominance value frequency domain coefficients other than to omit (to not omit) the encoding of the quantized chrominance value frequency domain coefficients in the output encoded bit stream representing the array of data elements, including data for the array of quantized chrominance value frequency domain coefficients in the output bit stream representing the encoded array of data elements In the case where data for (representing) the array of quantized chrominance value frequency domain coefficients is included in the output bit stream for a block of data elements, then that data representing the array of quantized chrominance value frequency domain coefficients can take any suitable and desired form, e.g., and in an embodiment, that can allow a decoder to reproduce the array of quantized chrominance value frequency domain coefficients. In an embodiment this data takes the form for that information that is required or used for the encoding scheme (e.g. standard) being used.

In an embodiment, the data that is included in the output bit stream for representing an array of quantized chrominance value frequency domain coefficients for a block of data elements comprises data indicating one or more of, and in an embodiment all of:

the values of all the non-zero quantized frequency domain coefficients in the array of quantized frequency domain coefficients;

the locations in the frequency domain of the non-zero frequency domain coefficients in the array of quantized frequency domain coefficients; and the location of the highest frequency non-zero frequency domain coefficient in the array of quantized frequency domain coefficients.

Other arrangements would, of course, be possible.

As discussed above, the determination of whether to include data for the array of quantized chrominance value frequency domain coefficients in the encoded output representing the data array in the technology described herein is determined during the process of encoding the array of data elements.

The encoding of the array of data elements can be performed in any suitable and desired manner, e.g., in dependence on, and according to, the particular encoding scheme (e.g. standard) that is being used. In the technology described herein, the encoding process should, and in an embodiment does, encode the luminance data values (the luma part) and the chrominance data values (the chroma part) for the data array (and data arrays) in question separately, so as to provide a suitably encoded set of luminance data and suitably encoded set or sets of chrominance data for the and each data array.

The luminance date (the luma part) can be encoded in the normal manner for the encoding scheme in question.

The chrominance data (the chroma part) should correspondingly be encoded in accordance with the encoding scheme that is being used, but with the encoding of the chrominance data being performed in accordance with the technology described herein, i.e. to include a determination in the manner of the technology described herein of whether or not to include data for an array of quantized chrominance value frequency domain coefficients for a (and in an embodiment each) block of data elements of the data array(s) being encoded.

As will be appreciated, the encoding process may comprise (for the luma and chroma data, respectively) generating an array of difference values that represents the difference between a source block and a reference block, generating an array of frequency domain coefficients for the array of difference values by applying a (e.g. complete) forward transformation process to the array of difference values, and/or generating an array of quantised coefficients by applying a (e.g. complete) quantisation process to the array of frequency domain coefficients. Appropriate encoding, such as, and in an embodiment, entropy encoding, may then be performed on the array of quantised coefficients (in the case where data for the array of quantized frequency domain coefficients is to be included in the output) (or data relating to the array of quantized coefficients will be omitted (not provided) in the case where it has been determined that that data should be omitted for a block).

In these arrangements, in the case where the luma part for a block of data elements to be encoded has been indicated as to be omitted (i.e. such that information representing a quantized array of frequency domain coefficients for the luma data values for the block of data elements will not be encoded in the output bit stream representing the array of data elements), then the encoding of the luminance data values for that block of data elements will accordingly not include (will omit) any encoding of and for any frequency domain coefficients for the luminance data values for the block of data elements in question. In this case, the encoding process in an embodiment does not generate any frequency domain coefficients (and a set of difference values (residuals)) for the luminance data values for the block at all (in the first place).

However, the encoding of the corresponding chrominance data values for the block of data elements for such an "omitted" block of data elements will be performed in the manner of the technology described herein, i.e. to still determine an array of quantized frequency domain coefficients for the chrominance data values for the block of data elements in question as part of the encoding process, and to then determine based on a property or properties of that determined array of quantized chrominance value frequency domain coefficients whether to then actually include the array of chrominance value frequency domain coefficients in the output encoded bit stream representing the array of data elements.

As will be appreciated, any of the processes that are performed in respect of a source block that corresponds to a region of the array may, in practice, be performed respectively for each (e.g. every) one of plural source blocks that correspond to the region or that correspond respectively to plural (different) regions of the array.

As will also be appreciated, any of the processes that are performed in respect of an array may, in practice, be performed respectively for each (e.g. every) one of plural arrays of the stream of arrays.

In any of the embodiments described herein, once encoded, the encoded source block(s) and/or encoded array and/or encoded stream of arrays may be used in any desired and suitable way. For example, the encoded source block(s) and/or encoded array and/or encoded stream of arrays may be output, e.g. stored in memory and/or streamed to another device. Thus, the data processing apparatus may comprise output circuitry (e.g. write out circuitry) configured to output (e.g. write out) the encoded source block(s) and/or encoded array and/or encoded stream of arrays, e.g. to memory or to another device. Any motion vectors, if used, may also be output in a similar way.

While the encoding of an array of data elements could always be performed in a particular, e.g. predefined, manner, in an embodiment, the encoding is done in accordance with a particular set of encoding options that have been selected to be used for the array of data elements, in an embodiment based, at least in part, on an analysis of the array of data elements. Thus, the encoding will be done in accordance with a particular set of encoding options that have been selected to be used for the array of data elements (or at least for the region of the data array that the source block falls within).

Thus, in the technology described herein, the encoding process is in an embodiment preceded by a process of selecting a set of encoding options to use when encoding the array of data elements.

Thus, the technology described herein in an embodiment further comprises (and includes apparatus configured to) first selecting a set of encoding options to use for the data array (and for respective blocks of the data array), with the operation in the manner of the technology described herein then being performed when encoding the chrominance data for a block of the data array in accordance with the selected set of encoding options for that block of the data array (or at least for the region of the data array that the source block falls within).

The selection of the encoding options to use for a given data array and respective regions and blocks of that data array can be performed in any suitable and desired manner. In an embodiment, it is performed using an appropriate rate distortion optimisation (RDO) process. Other arrangements would, of course, be possible.

In an embodiment, the selection of the encoding options is based on an analysis (e.g. an RDO process) that uses the luminance data (the luma part) of the data array (and stream of data arrays) only (i.e. that does not consider the chrominance data (the chrominance values) for the data elements of the data array(s)).

Thus, in an embodiment, the method of the technology described herein comprises:

(first) selecting encoding options to use when encoding an array of data elements of a stream of arrays of data elements, in an embodiment using luminance data only for the array of data elements; and once the encoding options to use when encoding the array of data elements have been selected, then encoding the array of data elements using and in accordance with the selected encoding options;

wherein:

the encoding of the array of data elements in accordance with the selected encoding options comprises:

encoding the luminance data (the luminance data values) for the array of data elements in accordance with the selected encoding options;

and separately, encoding the chrominance data (the chrominance data values) for the array of data elements in accordance with the selected encoding options;

wherein:

the encoding of the chrominance data values for the array of data elements in accordance with the selected encoding options further comprises:

when encoding the chrominance data values for a source block of data elements of the data array being encoded:

generating an array of chrominance difference values that represents the difference between the chrominance values of the source block of data elements of the array of data elements being encoded and the chrominance values for a reference block of data elements derived from the chrominance values of one or more arrays of data elements in the stream of arrays of data elements;

generating an array of chrominance value frequency domain coefficients for the array of chrominance difference values by applying a forward transformation process to the array of chrominance difference values;

generating an array of quantized chrominance value frequency domain coefficients by applying a quantization process to the array of chrominance value frequency domain coefficients;

determining whether the encoding of the quantized frequency domain coefficients for the luma data values for the block of the array of data elements being encoded is indicated as to be omitted; and when it is determined that the encoding of the quantized frequency domain coefficients for the luma data for the block of data elements of the data array being encoded is indicated as to be omitted:

determining whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and when it is determined based on the property or properties of the determined quantized chrominance value frequency domain coefficients to omit the encoding of the quantized chrominance value frequency domain coefficients in the output encoded bit stream representing the array of data elements, not including data for the array of quantized chrominance value frequency domain coefficients in the output bit stream representing the encoded array of data elements.

Correspondingly, in an embodiment, the apparatus of the technology described herein comprises:

encoding option selection circuitry operable to select a set of encoding options to use when encoding an array of data elements of a stream of arrays of data elements, in an embodiment using luminance data only for the array of data elements;

and encoding circuitry operable to:

encode luminance data (the luminance data values) for an array of data elements in accordance with a set of encoding options selected by the encoding option selection circuitry; and to:

encode, separately to the luminance data, chrominance data (the chrominance data values) for the array of data elements in accordance with the selected set of encoding options; wherein:

the encoding circuitry comprises:

difference value generating circuitry operable to generate an array of chrominance difference values that represents the difference between the chrominance values of a source block of data elements of an array of data elements being encoded and the chrominance values for a reference block of data elements derived from the chrominance values of one or more arrays of data elements in the stream of arrays of data elements;

frequency domain coefficient generating circuitry operable to generate an array of chrominance value frequency domain coefficients for the array of chrominance difference values by applying a forward transformation process to the array of chrominance difference values;

quantizing circuitry operable to generate an array of quantized chrominance value frequency domain coefficients by applying a quantization process to the array of chrominance value frequency domain coefficients;

and encoding determination circuitry operable to:

determine whether the encoding of the quantized frequency domain coefficients for the luma data values for the block of the array of data elements being encoded is indicated as to be omitted; and to, when it is determined that the encoding of the quantized frequency domain coefficients for the luma data for the block of data elements of the data array being encoded is indicated as to be omitted:

determine whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and to, when it is determined based on the property or properties of the determined quantized chrominance value frequency domain coefficients to omit the encoding of the quantized chrominance value frequency domain coefficients in the output encoded bit stream representing the array of data elements, not include data for the array of quantized chrominance value frequency domain coefficients in the output bit stream representing the encoded array of data elements.

In these embodiments, the process of selecting the encoding options to use when encoding an array of data elements is in an embodiment based on an estimate of a bit cost for encoding the array of data elements, and, in particular, for encoding respective source blocks of the array of data elements being encoded. In an embodiment a bit cost that relates to the encoding of the quantized frequency domain coefficients is considered (e.g. a bit cost that indicates how many bits will be included in the output encoded bit stream for conveying the necessary quantized frequency domain coefficient information to the decoder).

Thus, in an embodiment, the method of the technology described herein further comprises (and the apparatus is in an embodiment configured to) first selecting an encoding option to use when encoding the array of data elements by, for each of a plurality of different sets of encoding options:

generating an array of difference values that represents the difference between a source block of data elements of the array of data elements being encoded and a reference block of data elements derived from one or more arrays of data elements of the stream of arrays of data elements;

generating an array of frequency domain coefficients corresponding to the array of difference values by applying a forward transformation process to the array of difference values;

generating an array of quantized frequency domain coefficients by applying a quantization process to the array of frequency domain coefficients;

determining a bit count value for the particular set of encoding options for encoding the array of quantized frequency domain coefficients; and selecting, based on the bit count value, whether to encode the source block in accordance with the particular set of encoding options.

As discussed above, this is in an embodiment done using (considering) only the luma data (the luminance data values) (and not the chroma data (the chrominance data values) for the block(s) of data elements being considered.

In these arrangements, the bit count value for encoding the array of quantized frequency domain coefficients for a particular set of encoding options in an embodiment at least represents a bit count value for encoding the locations of the non-zero quantized frequency domain coefficients in the array of quantized frequency domain coefficients for the source block of data elements being encoded.

(The array of quantized frequency domain coefficients will, in effect, comprise a 2D array of frequency domain coefficients, with each coefficient position within that array having a given value (which will be zero or non-zero). The encoded data representing the data array (e.g. video frame) being encoded accordingly needs to indicate which positions in the frequency domain coefficient array have non-zero values.)

In an embodiment, the bit count value also takes account of (also includes) a bit cost for encoding other information relating to the quantized frequency domain coefficients, and in particular includes (and takes account of) one or more of, and in an embodiment both of: a bit cost for specifying the location of the highest frequency non-zero quantized frequency domain coefficient, in the array of quantized frequency domain coefficients (in the scan order of the frequencies); and a bit cost for specifying the values of all of (of each of) the non-zero quantized frequency domain coefficients in the array of quantized frequency domain coefficients for the source block being encoded.

These various bit costs can be estimated and derived in any suitable and desired manner, for example using existing or known techniques for that purpose.

Other bit count costs, such as a bit cost for specifying the prediction type could also be considered (taken into account), if desired.

Correspondingly, in these embodiments, the method may further comprise performing, and the apparatus may further comprise processing circuitry configured to perform, a search process (e.g. an intra search and/or an inter search (as part of a motion estimation process)) that selects one or more candidate reference blocks. The one or more candidate reference blocks may be selected based on a similarity or difference metric, such as a sum of absolute differences (SAD) value, with respect to the source block. The reference block may be one of the one or more candidate reference blocks.

Thus, the method may further comprise performing, and the apparatus may further comprise processing circuitry configured to perform, a motion estimation process that determines one or more motion vectors. As will be appreciated, the one or more motion vectors may indicate how to derive the data elements of the reference block from the one or more arrays of data elements (e.g. by translating, rotating, scaling, etc.). The method may further comprise performing, and the apparatus may further comprise processing circuitry configured to perform, a motion compensation process that applies the one or more motion vectors to the one or more arrays of data elements to derive the reference block. Thus, in embodiments, the reference block may comprise a motion-compensated "prediction" block. As will be appreciated, using motion compensation can, for example, reduce the difference between the reference block and the source block. This in turn can reduce the bit count value and/or distortion value.

Again, the motion estimation operation and reference (predicted) block selection and derivation is in an embodiment done using (considering) only the luma data (the luminance data values) for block(s) of data elements being considered.

In an embodiment, as well as being based on a bit cost for encoding the array of data elements (e.g. a bit count value for (the number of bits needed for) encoding the array of quantized frequency domain coefficients), the selection of whether to encode a source block in accordance with the particular set of encoding options also takes account of, and is based on, a distortion value for the particular set of encoding options being considered.

Thus, in an embodiment, the method of the technology described herein comprises (and the apparatus of the technology described herein is configured to) selecting, based on an estimated bit count value and a distortion value, whether to encode the source block in accordance with the particular set of encoding options.

The distortion value can be determined in any suitable and desired manner. It is in an embodiment indicative of an amount of distortion that would be introduced when encoding and then decoding the source block in accordance with the particular set of encoding options under consideration.

In an embodiment, the distortion value is based on a set of error values that represent the difference between the original source block, and a reconstructed version of that source block following encoding and then decoding the source block in accordance with the particular set of encoding options under consideration (e.g. as is shown in the RDO process of FIG. 1).

In these embodiments, the set of error values could, accordingly, be based on a comparison of the reconstructed source block with the original source block.

Other arrangements for determining a set of error values to be used to determine a distortion value could be used if desired. For example, a set of error values to be used to determine the distortion value could be generated from the array of de-quantized frequency domain coefficients and the generated array of frequency domain coefficients (such that the set of error values will represent the difference between the generated array of frequency domain coefficients and the array of de-quantized frequency domain coefficients, for example, rather than generating the set of error values from a reconstructed source block and the original source block itself).

The distortion value for the particular set of encoding options can be determined from the set of error values in any desired and suitable way. In embodiments, determining the distortion value may comprise determining a sum-square of the error values of the set of error values.

In any of the embodiments described herein, selecting, based on the bit count value, e.g. and the distortion value, whether to encode the source block in accordance with the particular set of encoding options can be performed in any desired and suitable way. In embodiments, selecting whether to encode the source block in accordance with the particular set of encoding options may comprise determining a cost value for the particular set of encoding options based on the bit count value, e.g. and the distortion value, and selecting, based on the cost value, whether to encode the source block in accordance with the particular set of encoding options. Determining the cost value may comprise combining the bit count value and the distortion value. The combination of the bit count value and the distortion value may be any suitable and desired combination, such as a weighted combination of the bit count value and the distortion value.

In embodiments, the particular set of encoding options may be selected when the bit count value and/or the distortion value and/or the cost value is the lowest such value of plural such values determined for respective different sets of encoding options. The particular set of encoding options may also or instead be selected when the bit count value and/or the distortion value and/or the cost value is below a selection threshold for such a value.

The encoding option selection process should, and in an embodiment does, include the possibility of being able to (and determining whether to) omit the encoding of the array of quantized frequency domain coefficients for a given source block being encoded (i.e. to identify that the encoding of the (quantized) frequency domain coefficients for a source block being encoded should be omitted in the output encoded bit stream representing the array of data elements). As discussed above, this is in an embodiment (only) done for the luma part (the luminance data values) of the array of data elements being encoded, such that the encoding of the array of quantized frequency domain coefficients can be identified as suitable to be omitted for the luma data values for blocks of data elements within the array of data elements being encoded.

As discussed above, in the event that it is identified that the encoding of the array of quantized frequency domain coefficients can be omitted for a block of data elements, the encoding options for that block of data elements in an embodiment include an appropriate indication (e.g. a flag) to indicate to the encoder (and to the decoder) that the encoding of the array of quantized frequency domain coefficients for the luminance data values for the block of data elements in question should be omitted.

As will be appreciated, the above encoding option selecting processes may be, and in an embodiment are, performed respectively for each (e.g. every) one of plural different sets of encoding options. This can allow, for example, for a more suitable set of encoding options to be selected.

In any of the embodiments described herein, the different sets of encoding options may be characterised by any one or more encoding options as desired. The one or more encoding options that characterise a particular set of encoding options may include, for example, the particular size of the source block (in terms of data elements), the particular way in which the reference block is derived (e.g. the mode used, such as intra, inter, forward, backward, uni-directional, bi-directional, merge, etc. mode, and/or the motion vector used), etc.

Once an array of data elements, etc., has been encoded, the encoded source block(s) and/or encoded array and/or encoded stream of arrays may later be retrieved and/or received, e.g. for decoding. Thus, the data processing apparatus may comprise input circuitry (e.g. read in circuitry) configured to input (e.g. read in) the encoded source block(s) and/or encoded array and/or encoded stream of arrays, e.g. from memory. Any motion vectors, if used, may also be input in a similar way.

Encoding a source block may thus be followed by a decoding process that decodes the encoded source block. Thus, the data processing apparatus may comprise processing circuitry configured to perform a decoding process that decodes an encoded source block. The decoding process can take any desired and suitable form, for example that corresponds to the encoding process that was used when encoding the encoded source block. The decoding process may be defined by the standard (e.g. HEVC standard) that was used when encoding the array of data elements. For example, the decoding process may comprise entropy decoding.

As will be appreciated, the (e.g. entropy) decoding may comprise producing an array of quantised coefficients for the encoded source block. The decoding process may then comprise generating an array of de-quantised coefficients by applying a (complete) de-quantisation process to the array of quantised coefficients, generating an array of reconstructed difference values by applying a (complete) inverse transformation process to the array of de-quantised coefficients, and/or generating a reconstructed source block by combining the array of reconstructed difference values and the reference block. Combining the array of reconstructed difference values and the reference block may comprise adding together the difference values of the array of reconstructed difference values and the respective values of the corresponding (in terms of data position) data elements of the reference block.

As discussed above, a reference block may comprise a motion compensated prediction block. The decoding may accordingly further comprise a motion compensation process that applies one or more motion vectors to one or more decoded arrays of data elements to derive the reference block.

Correspondingly, the decoding should, and in an embodiment does, also comprise identifying when the encoding of an array of quantized frequency domain coefficients (whether for the luma values, or both the luma and chroma values) for a block of data elements has been omitted (e.g. by identifying the presence of an appropriate indicator in the set of bits representing the encoded array of data elements), with the decoder then proceeding accordingly, i.e. by reproducing the reference block for the block of data elements in question and using the appropriate data values for the reference block as the data values for the output, decoded block of data elements in question (without applying any reconstructed difference values (residuals) to the data elements of the reference block).

In any of the embodiments described herein, once determined, the data elements of a decoded source block (and data array) may be used in any desired and suitable way.

For example, the data elements of a decoded source block (and data array) may be output (e.g. by an output (e.g. display) processor), e.g. for display. In these embodiments, the arrays of data elements may correspond to images, e.g. frames of image data, and the data elements may correspond to a pixel or pixels.

As will be appreciated, any of the processes that are performed in respect of an encoded source block of an encoded array may, in practice, be performed respectively for each (e.g. every) one of plural encoded source blocks of the encoded array.

As will also be appreciated, any of the processes that are performed in respect of an encoded array of an encoded stream of arrays may, in practice, be performed respectively for each (e.g. every) one of plural encoded arrays of an encoded stream of arrays.

The processes described herein in any embodiment may be performed by any desired and suitable apparatus. For example, the processes described herein in any embodiment may be performed by a video processor (codec). The data processing apparatus described herein in any embodiment may therefore comprise or may be a video processor. Thus, the processing circuitry, output circuitry or write out circuitry, input circuitry or read in circuitry, etc. described herein in any embodiment may form part of a video processor. The data processing apparatus described herein in any embodiment may comprise, or may be, or may form part of, a system on chip (SoC).

The memory referred to herein may be any desired and suitable memory of or for the data processing apparatus. The memory may be external to the data processing apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

The technology described herein can correspondingly be used with and for any suitable and desired encoding (e.g. video encoding) scheme and standard. In an embodiment, it is used with and for the HEVC encoding standard.

In an embodiment, the various functions of the technology described herein are carried out on a single data (e.g. image) processing platform that provides and/or uses the arrays of data elements.

As will be appreciated by those skilled in the art, the data processing apparatus of the technology described herein may be part of an overall data processing system that includes, for example, a host (e.g. central) processor. The host processor may, for example, execute applications that require data processing by the data processing apparatus. The host processor may send appropriate commands and data to the data processing apparatus to control it to perform the data processing operations and to generate and/or use an output required by applications executing on the host processor. To facilitate this, the host processor may execute a driver for the data processing apparatus and/or may execute a compiler or compilers for compiling programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a video camera that generates the arrays of data elements.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

As discussed above, embodiments of the technology described herein relate to arrangements that comprise selecting encoding options to use when encoding an array of data elements. Various embodiments of the technology described herein will now be described in the context of the encoding frames of image data for display. However, the concepts described herein can equally be applied to contexts in which arrays of other types of data are to be encoded.

Figure 3:
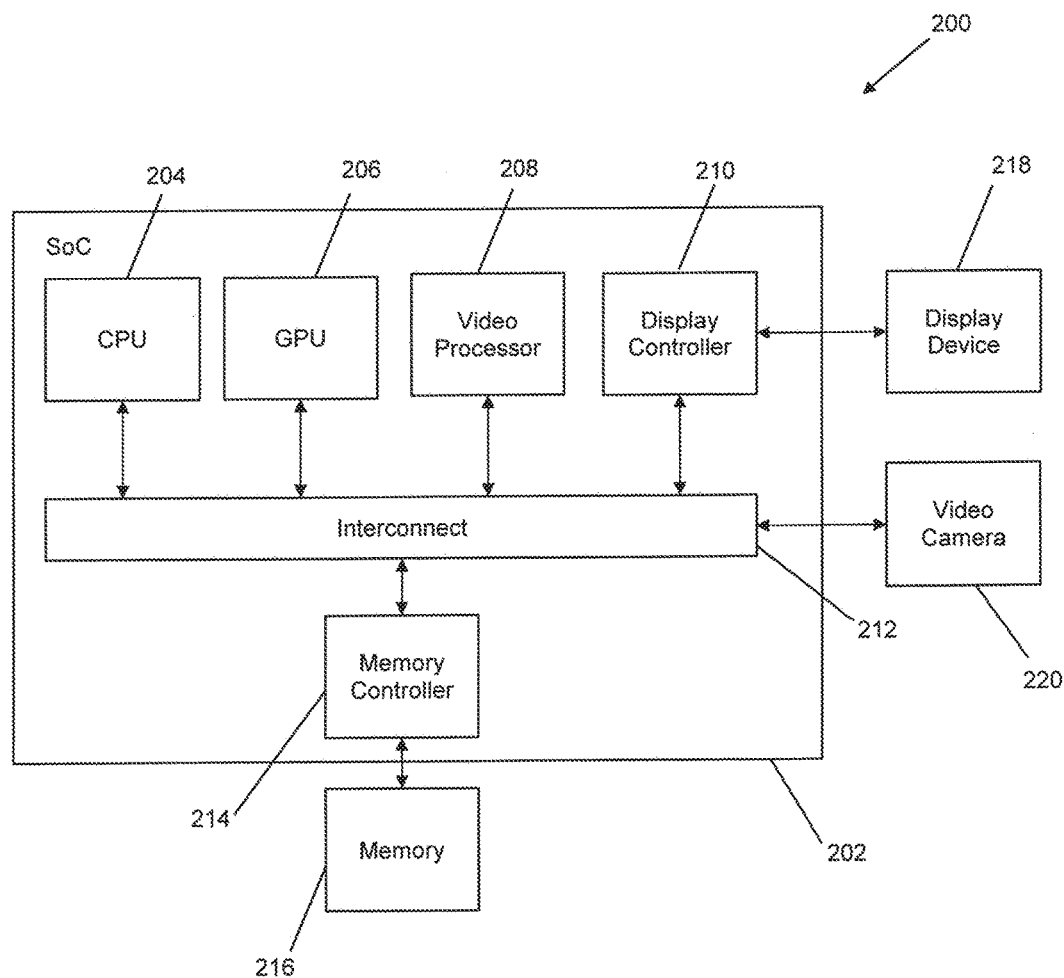
FIG. 3 shows schematically a data processing system according to embodiments of the technology described herein.

FIG. 3 shows schematically an embodiment of a data processing system 200 that can provide and use data arrays, such as frames for display, that have been encoded in the manner of the present embodiments.

In this embodiment, the system 200 comprises a data processing apparatus in the form of a system on chip (SoC) 202. The system 200 also comprises off-chip (main) memory 216, a display device 218 and a video camera 220.

The SoC 202 comprises a central processing unit (CPU) 204, a graphics processing unit (GPU) 206, a video processor 208, a display controller 210, an interconnect 212 and a memory controller 214.

As is shown in FIG. 3, the CPU 204, GPU 206, video processor 208, and display controller 210 communicate with each other via the interconnect 212 and with the memory 216 via the interconnect 212 and memory controller 214. The display controller 210 also communicates with the display device 218. The video camera 220 also communicates with the SoC 202 via the interconnect 212.

In the following embodiments, the video processor 208 reads in image data from memory 216, encodes the image data, and then outputs that encoded image data, e.g. for storage in memory 216 or for streaming to another device. The encoded image data can later be retrieved and decoded, e.g. by the video processor 208, or received and decoded by another device. The decoded image data can then be output, e.g. by the display controller 210 to the display device 218 or by another device, for display.

Figure 4:
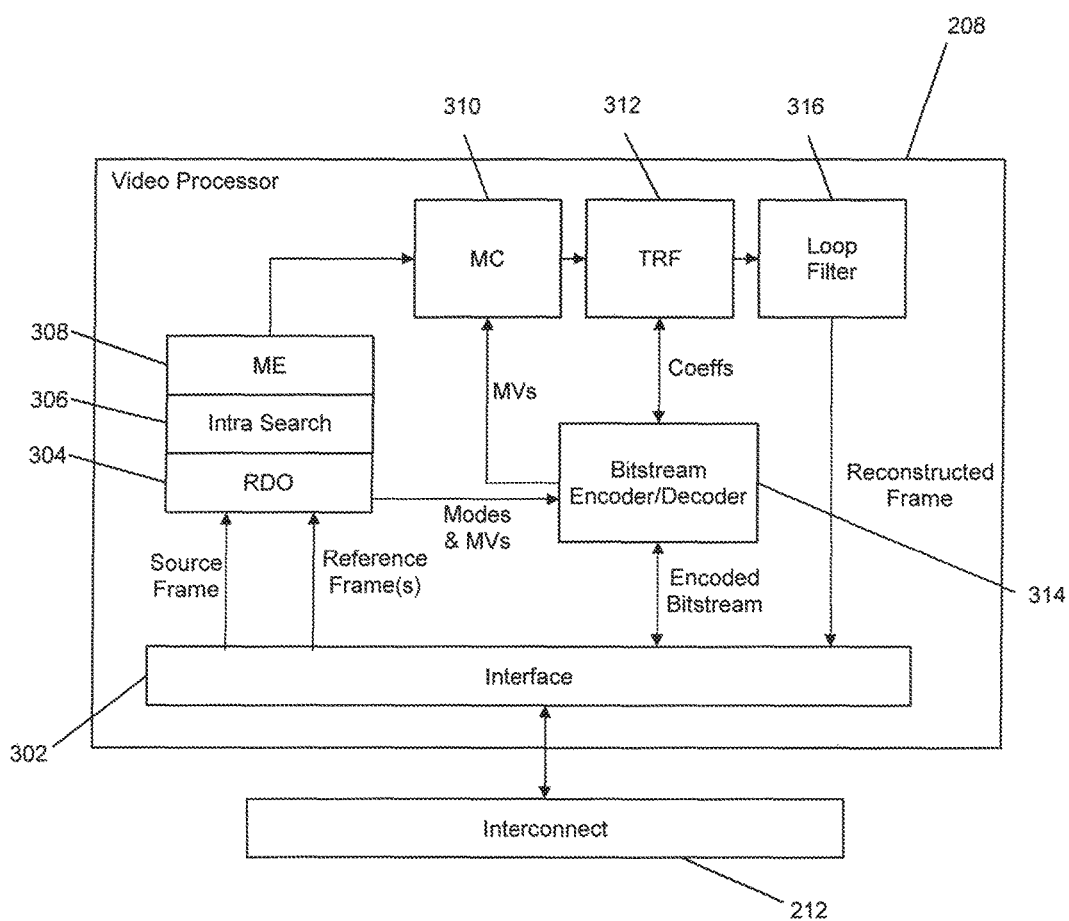
FIG. 4 shows schematically a video processor according to embodiments of the technology described herein.

FIG. 4 shows further details of a video processor 208 that can be used to encode and decode a stream of arrays of data elements, such as frames for display, in the manner of the present embodiments.

In this embodiment, the video processor 208 comprises an interface 302 that can provide, via the interconnect 212, a current "source" frame to be encoded. In a similar manner, the interface 302 can provide, via the interconnect 212, one or more previous and/or subsequent "reference" frames that may be used when encoding the source frame.

In this embodiment, the source frame is divided into plural source blocks to be encoded on a block by block basis. Each source block is initially 16×16 data elements (pixels) in size. Each source block can, however, be further divided into two 16×8 or 8×16 source blocks or four 8×8 source blocks, if that would provide for less costly encoding. Each of these smaller source blocks can also be further divided into two 8×4 or 4×8 source blocks or four 4×4 source blocks, if that would provide for less costly encoding. Other source block sizes could of course be used as desired.

In this embodiment, a source block can be encoded using another block within the source frame itself, i.e. using "intra" mode encoding. The video processor 208 accordingly comprises inter search circuitry 306 that, for a given source block in the source frame, searches within the source frame itself for one or more suitable candidate reference blocks to consider using when encoding that source block. The one or more candidate reference blocks may be selected using any suitable metric that indicates the similarity or difference between the source block and the potential reference block in question, such as a sum of absolute differences (SAD) value.

In this embodiment, the one or more reference frames are also divided into plural blocks (which may correspond in size to the source block) that may be used when encoding the source frame, i.e. using "inter" mode encoding. The video processor 208 accordingly comprises ME (motion estimation) circuitry 308 that, for a given source block in the source frame, searches within the one or more reference frames for one or more suitable candidate reference blocks to consider using when encoding that source block. A candidate reference block can be derived by using a motion vector (MV) that describes how a particular block of a particular frame is mapped (e.g. by translation, rotation and/or scaling) to that candidate reference block. Again, the one or more candidate reference blocks may be selected using any suitable metric that indicates the similarity or difference between the source block and the potential reference block in question, such as a sum of absolute differences (SAD) value.

RDO (Rate Distortion Optimisation) circuitry 304 then performs an RDO process in respect of each source block using the candidate reference blocks for that source block. In this embodiment, the output of the RDO circuitry 304 comprises a selected set of encoding options for a particular source block (e.g. having a particular size in terms of data elements of the frame). In this embodiment, the selected set of encoding options further comprises a particular way to derive a reference block for that particular source block (e.g. the encoding mode to be used, such as intra, inter, unidirectional, bidirectional, merge, etc., mode, and/or the motion vector to be used).

The present embodiments are concerned in particular with the encoding of video data that is in a YUV format (i.e. for which respective sets of luminance (luma) data (Y) values and chrominance data values (U and V) are provided). In the present embodiments, when encoding video frames in a YUV format, the set of encoding options to use for encoding the video frame (data array) is selected based on (by considering) the luminance data values for the frame (array) only, with the luminance and chrominance data values for the frame then being respectively and separately encoded using and based on the set of encoding options selected from the analysis of the luminance data values.

This operation will now be discussed in more detail with reference to FIG. 1.

As shown in FIG. 1, the first part of the process is for the video processor 208 to select a set of encoding options to use when encoding the video frame (array of data elements) being considered. In the case of a YUV video frame, this RDO process will be performed in the present embodiments using (analysing) the luminance data values for the video frame only.

As shown in FIG. 1, in step 102, the RDO circuitry 304 of the video processor 208 selects a set of encoding options to consider for a region of the current source frame. As discussed above, the set of encoding options can be for a particular source block (e.g. having a particular size in terms of data elements of the frame) and/or can include, for example, particular motion vectors and/or a particular encoding mode (intra, inter, forward, backward, uni-directional, bi-directional, merge, etc. mode) used to derive the reference block for that particular source block.

Then, in step 104, the RDO circuitry 304 of the video processor 208 determines a cost value for the set of encoding options.

Figure 2:
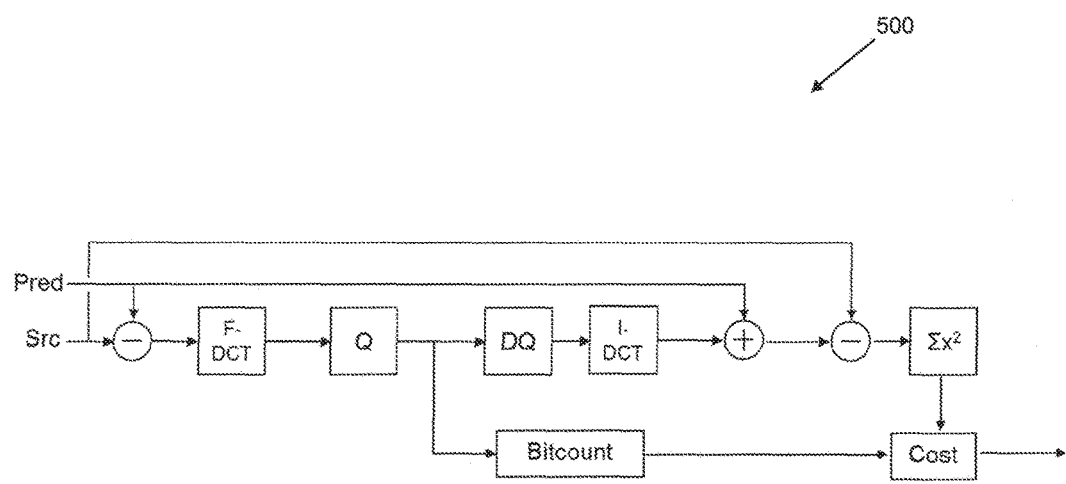
FIG. 2 illustrates a method of determining a cost value for a particular set of encoding options.

In the present embodiments, the cost value for the set of encoding options is determined based on and using the luminance data values for the source frame (video frame) being considered, and is done using an RDO process of the form shown, for example, in FIG. 2.

As part of this processing, it also determined whether to omit the encoding of the array of quantized frequency domain coefficients for the luma data values for a block of data elements of the source frame being considered for the set of encoding options in question. Thus, a set of encoding options can include the possibility of omitting the encoding of the array of quantized frequency domain coefficients for the luminance data values for a block of data elements of the frame being encoded.

Figure 5:
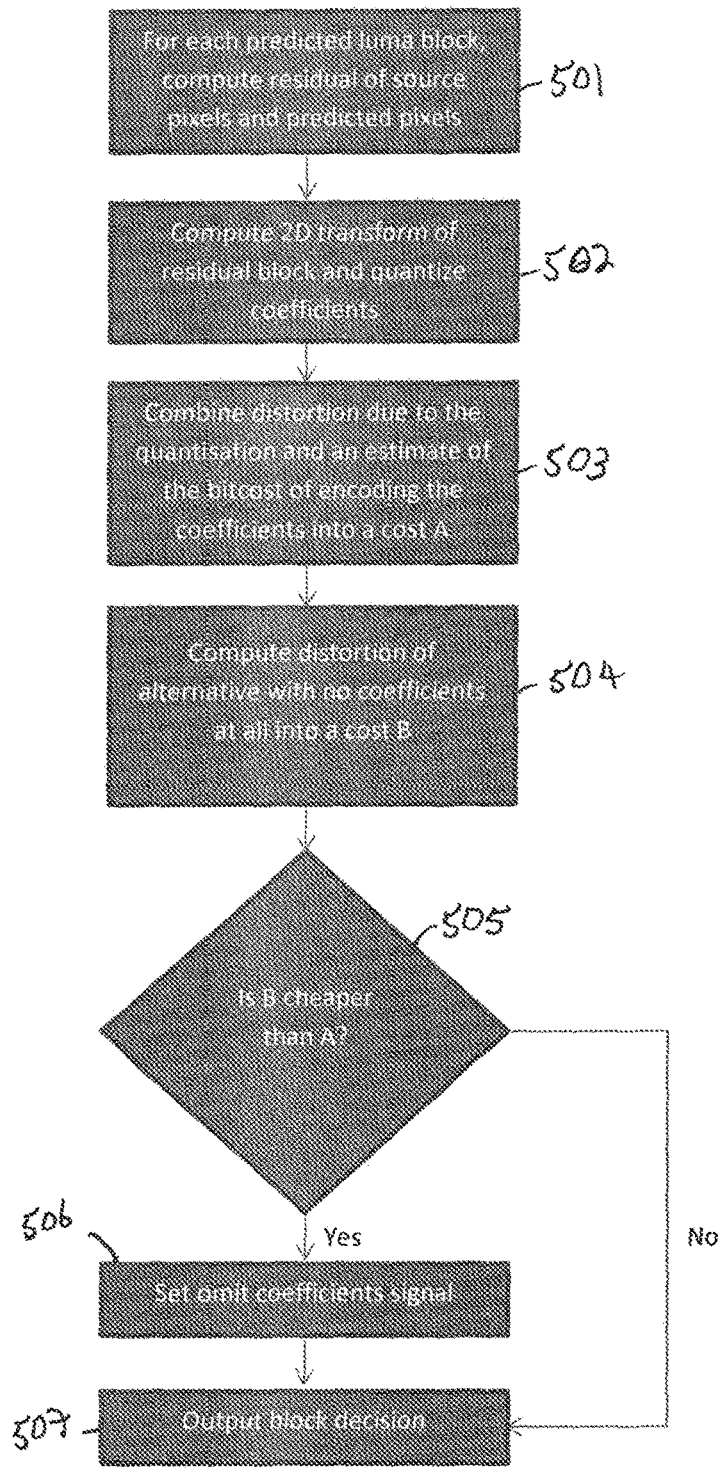
FIG. 5 shows a process for determining whether to omit the encoding of quantized frequency domain coefficients for the luminance data values for a block of a data array being encoded.

FIG. 5 shows the process for determining whether to omit the encoding of the array of quantized frequency domain coefficients for the luminance data values for a block of data elements being encoded in the present embodiment.

As shown in FIG. 5, for each reference (predicted) luma block that is being considered by the RDO process, the residuals (set of differences) between the source pixels (data elements) and predicted (reference) pixels (data elements) is determined (step 501), and then a two-dimensional frequency domain transformation of the determined array of difference values (residual block) is generated and the frequency domain coefficients quantized (step 502).

An estimate of the distortion due to the quantization process and an estimate of the bit cost of encoding the quantized frequency domain coefficients is then used to derive a combined overall cost measure that would be incurred if encoding the array of quantized frequency domain coefficients (step 503).

Correspondingly, a distortion measure if encoding the luminance data values for the block of data elements without using any quantized frequency domain coefficients (i.e. so as to simply replicate the reference (predicted) data values for the block) is used to determine an alternative cost measure for the cost of encoding the luma data for the block without the use of frequency domain coefficients (step 504).

It is then determined whether the cost of the alternative of encoding the block without encoding any frequency domain coefficients is less than the cost of encoding the block with the frequency domain coefficients (step 505). If so, it is determined that the preferred encoding option for the particular predicted luma block being considered is to omit the encoding of the frequency domain coefficients, and so the indication that that should be done is set accordingly and that encoding decision for the block is output (steps 506 and 507).

Conversely, if the cost of the alternative of encoding the block without encoding any frequency domain coefficients is determined to be more than the cost of encoding the block with the frequency domain coefficients at step 505, it is determined that the encoding of the frequency domain coefficients should be performed for the particular predicted luma block being considered, and so an encoding decision to that effect for the block is output (step 507).

Thus, as shown in FIG. 5, for each predicted luma block alternative being considered, two versions are measured in the RDO rate-distortion metric, one with the frequency domain coefficients and one without them. The lower cost option is then selected for the predicted block in question. This is done for each block of data elements to be encoded for the data array, to determine for each respective block, whether to omit the encoding of the frequency domain coefficients for the luma data for that block or not.

As shown in FIG. 1, the lower cost option determined for a predicted block is then compared to the so-determined selecting encoding costs for other blocks and other possible encoding options, to determine the actual encoding option to use for a given region and block of the data array.

Thus, as shown in FIG. 1, in step 106, the RDO circuitry 304 of the video processor 208 determines whether or not all sets of encoding options have been considered for the region.

If there are still sets of encoding options to be considered, then the next set of encoding options is selected at step 108 and the process returns to step 104 to determine a cost value for that next set of encoding options. For example, differently sized source block(s) and/or differently derived reference block(s) may be considered.

Once all of the sets of encoding options have been considered then, in step 110, one or more of the sets of encoded options are selected based on the respective cost values for the different sets of encoding options. In this embodiment, the set(s) of encoding options with the lowest cost value(s) are selected.

Once the encoding options have been selected and the determination of whether to omit the encoding of the frequency domain coefficients for the luma data has been made, the video processor 208 can encode each of the one or more source blocks for the region in accordance with the selected set of encoding options (and "omit" indications) for the source blocks (step 112).

In the present embodiments, the video processor 208 encodes the chrominance data values and the luminance data values for the source frame being encoded separately.

For the luminance data values, the video processor will encode each of the source blocks for the frame being encoded in accordance with the selected set of encoding options for that source block. Thus this will, for example, include, where the encoding options indicate this, omitting the encoding of an array of luminance value frequency domain coefficients for a block of data elements, and in this case, not generating the array of difference values, nor the array of frequency domain coefficients at all (in the first place).

The chrominance data values for the frame being encoded will correspondingly be encoded by the video processor 208 in accordance with the selected set of encoding options that were selected based on the analysis of the luminance data values.

However, in the event that the selected set of encoding options indicates that the encoding of the quantized array of frequency domain coefficients should be omitted, the video processor 208 will not simply omit the encoding of the array of quantized frequency domain coefficients for the chrominance data values for the block of data elements being considered, but instead will still generate an array of quantized frequency domain coefficients for the chrominance data values and then consider a property or properties of the so-determined array of quantized frequency domain coefficients to determine whether to actually omit the encoding of the quantized array of chrominance value frequency domain coefficients from the output bit stream or not.

Figure 6:
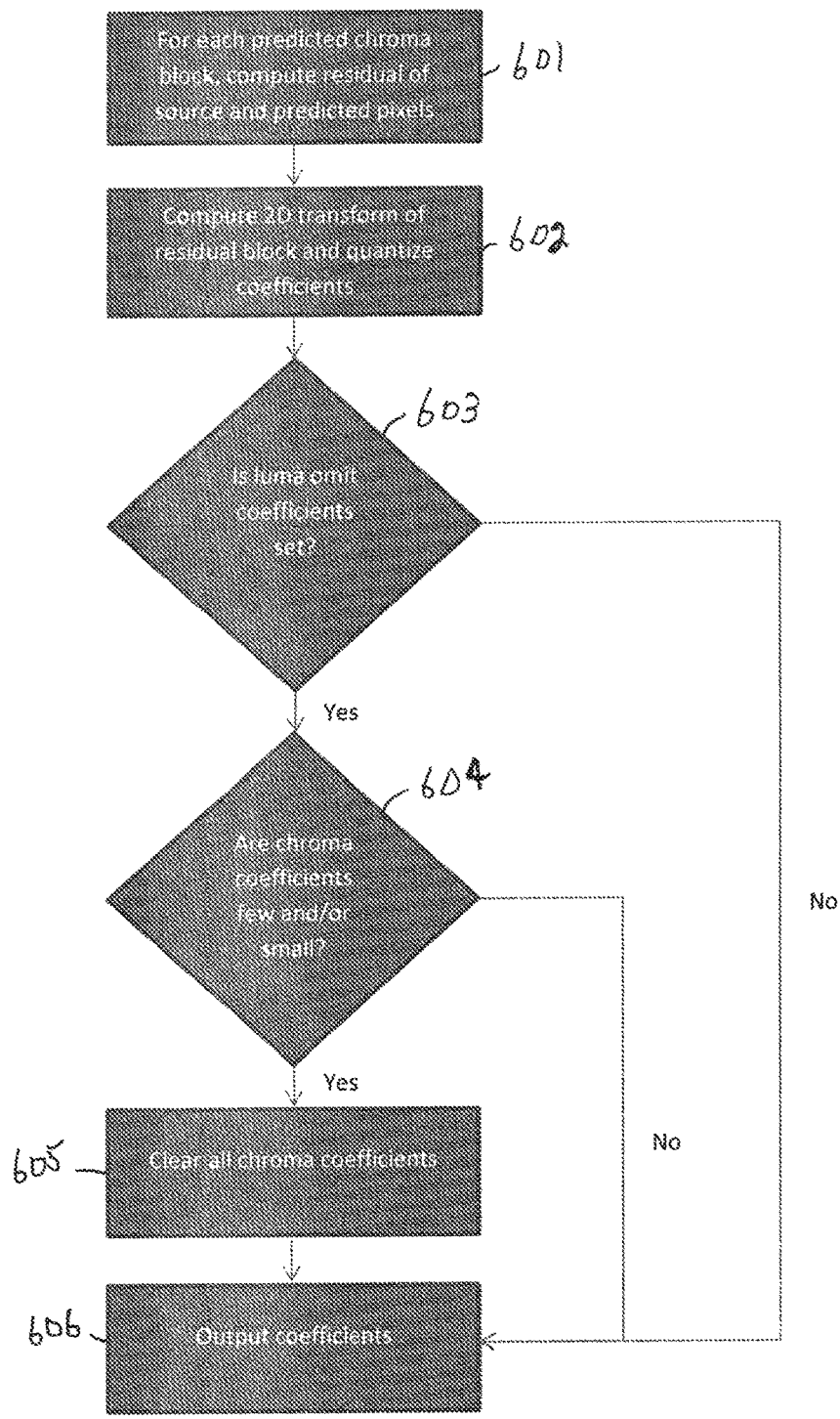
FIG. 6 shows a process for determining whether to omit the encoding of quantized frequency domain coefficients for the chrominance data values for a block of a data array being encoded.

FIG. 6 shows the process for determining whether to omit the encoding of the array of quantized frequency domain coefficients for the chrominance data values for a block of data elements being encoded in the present embodiment.

As shown in FIG. 6, for each reference (predicted) chroma block, the residual (set of differences) between the source pixels (data elements) and predicted (reference) pixels (data elements) is determined (step 601), and then a two-dimensional frequency domain transformation of the determined array of difference values (residual block) is generated and the frequency domain coefficients quantized (step 602).

It is then determined whether the encoding of the frequency domain coefficients for the luminance data for the block being considered was indicated as to be omitted (step 603). If not, then the quantized array of chrominance value frequency domain coefficients is simply encoded in the output bit stream in the normal manner.

On the other hand, if the encoding of the array of quantized frequency domain coefficients for the luminance data values is indicated as to be omitted, it is then determined whether the non-zero coefficients in the array of quantized chrominance data value frequency domain coefficients for the block are few in number and/or small in size (step 604).

If the number and/or size of the non-zero quantized chrominance value frequency domain coefficients is determined to be sufficiently few and/or small, then it is determined that the encoding of the quantized frequency domain coefficients for the chrominance data for the block in question can be omitted (step 605), and in that case, the determined quantized chrominance value frequency domain coefficients are cleared (set to zero) so as to not be included in (to be omitted from) the output bit stream (set of bits) representing the chrominance data values for the block in question (step 605).

On the other hand, if the non-zero quantized chrominance value frequency domain coefficients are not determined as being sufficiently few and/or small, then appropriate data representing those coefficients is included in the output bit stream (set of bits) representing the chrominance data values for the block in question.

This process is repeated for each block of data elements being encoded.

In the present embodiments, the size of the non-zero quantized chrominance value frequency domain coefficients may be considered in terms of the size (the value) of the largest absolute value of the determined quantized chrominance value frequency domain coefficients, and/or the sum of the absolute values of the determined quantized chroma value frequency domain coefficients for the block being encoded, for example.

In the present embodiments, the criteria for determining whether the non-zero quantized chrominance value frequency domain coefficients are sufficiently few and/or small to trigger the omission of the encoding of those coefficients in the output bit stream is dependent upon the size of the block of data elements that is being encoded and a quality parameter (a quality indication) for the encoding being performed.

For example in the case of HEVC video encoding, if qp is the HEVC quality parameter and is an integer in the range 0 through 51, and sz is a size parameter with sz=2 for a 4×4 chroma block, sz=3 for an 8×8 chroma block, and sz=4 for a 16×16 chroma block, the chrominance value frequency domain coefficients could be omitted (cleared) if the number of non-zero coefficients after transformation and quantization is at most: $qp/2^{(7-sz)}$.

Other arrangements would, of course, be possible.

As shown in FIG. 1, once a source block has been encoded, the video processor 208 writes out the encoded source block to memory 216 (step 114).

As will be appreciated, the above steps of FIG. 1 would be performed in respect of each region of the source frame and in respect of each frame of the stream (sequence) of frames so as to generate and store an encoded stream (sequence) of frames.

At a later time, when it is desired to decode the encoded frame, the video processor 208 can read in the encoded source blocks from memory 216 in step 116. Then, in step 118, the video processor 208 decodes the encoded source blocks.

Finally, in step 120, the video processor 208 outputs the decoded source blocks, for example to the display processor 210 for display on the display device 218.

Again, as will be appreciated, the above steps of FIG. 1 would be performed in respect of each encoded source block of each encoded frame so as to generate and output a decoded stream of frames.

Various alternative embodiments to the process of FIG. 1 are also contemplated.

For example, the video processor 208 may select a set of encoding options to consider and may determine a cost value for that set of encoding options. The set of encoding options may be selected for use when encoding the array of data elements if the cost value is below a threshold value. If the cost value is not below the threshold value, then the video processor 208 may repeat the process with a different set of encoding options. This process may continue until a set of encoding options having a suitably low cost value is found or until a termination condition is reached.

For another example, instead of being written out to memory, the encoded stream of arrays may be streamed to another device. That other device may then decode the encoded stream of arrays and output the decoded stream of arrays, e.g. for display.

A process of encoding a source block of a source frame using a selected set of encoding options (e.g. as per step 112 of FIG. 1) will now be described with reference to FIG. 3.

Firstly, a selected reference block that is to be used to encode a selected source block is provided. For example, where the source block is to be encoded in inter mode, MC (motion compensation) circuitry 310 applies a selected motion vector generated by the ME circuitry 308 to a selected reference frame to derive the selected reference block. Similarly, where the source block is to be encoded in intra mode, a selected reference block of the source frame is derived by TRF (transform) circuitry 312.

In either case, the TRF circuitry 312 then subtracts the data elements of the selected source block from the data elements of the selected reference block to generate a set of difference values. The TRF circuitry 312 then applies a full forward discrete cosine transformation process to the set of difference values to generate a set of frequency domain coefficients. The TRF circuitry 312 then applies a full quantisation process to the set of frequency domain coefficients to generate a set of quantised coefficients.

A bitstream encoder/decoder 314 then encodes the coefficients for the source block that are generated by the TRF circuitry 312. The encoding scheme can comprise any suitable entropy (variable length) coding scheme.

As will be appreciated, the above encoding process is then repeated for each selected source block of the source frame using the selected sets of encoding options for the source frame.

The output of the bitstream encoder/decoder 314 is accordingly an encoded bitstream that comprises sets of encoded coefficients. The selected modes and/or motion vectors that were used in the encoding process are also included in the bitstream.

The encoded bitstream can then be output, e.g. to memory 216 or streamed to another device, via the interface 302.

A process of decoding an encoded source block (e.g. as per step 118 of FIG. 1) will also now be described with reference to FIG. 3.

First, an encoded bitstream is provided, e.g. from memory 216 or from another device, via the interface 302.

The bitstream encoder/decoder 314 then decodes the encoded bitstream to generate a set of quantised coefficients for the source block to be reconstructed. The decoding scheme can comprises any suitable decoding scheme that corresponds to the entropy encoding scheme that was used to encode the bitstream.

The TRF circuitry 312 then applies a full dequantisation process to the set of quantised coefficients to generate a set of frequency domain coefficients for the source block to be reconstructed. The TRF circuitry 312 then applies a full inverse discrete cosine transformation process to the set of frequency domain coefficients to generate a set of difference values for the source block to be reconstructed.

A reference block that was used to encode the source block is also provided. For example, where the source block was encoded in inter mode, the relevant reference block is derived from a previously reconstructed reference frame. Similarly, where the source block was encoded in intra mode, the relevant reference block is derived from a previously reconstructed region of the source frame.

In either case, the TRF circuitry 312 then adds the set of difference values to the data elements of the reference block to generate the data elements of the reconstructed source block.

As will be appreciated, the above decoding process is then repeated for each source block of the source frame.

A loop filter 316 is then used to smooth or "de-block" the regions of the reconstructed source frame. The reconstructed source frame can then be output, e.g. for display, via the interface 302.

Other arrangements for the data processing system 200, data processing apparatus 202 and video processor 208 would, of course, be possible.

It should again be noted here that the drawings are only schematic, and that, for example, in practice the shown elements may share significant hardware circuits, even though they are shown schematically as separate elements in the drawings. For example, one or more of the processes (e.g. motion compensation, transformation, quantisation, etc.) that are performed in the RDO process may be performed using the same circuitry as the equivalent steps that are performed in the encoding and/or decoding processes.

It can be seen from the above that the technology described herein, in its embodiments at least, can provide an effective way of determining whether to omit the encoding of quantized frequency domain coefficients for the chrominance data values for a block of a YUV data array being encoded, and they can, in particular provide a mechanism for that determination that can reduce artefacts caused by inappropriate omitting of the encoding of the quantized chrominance value frequency domain coefficients, but without a greatly increased processing burden for that process (and in particular without, for example, having to perform any distortion or bit cost evaluation for the encoding of the quantized chrominance value frequency domain coefficients).

This is achieved in the embodiments of the technology described herein at least, by, when encoding chrominance data values for a block of data elements, determining whether the encoding of the frequency domain coefficients for the luminance data values for the block of data elements is to be omitted, and if so, then deciding whether to omit the encoding of the chrominance value frequency domain coefficients based on a property or properties of the quantized chrominance value frequency domain coefficients.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of encoding an array of data elements of a stream of arrays of data elements, in which the array of data elements is to be encoded as respective sets of luminance and chrominance data values, and is to be encoded as respective blocks of data elements making up the array of data elements, the method comprising:
   when encoding the chrominance data values for a source block of data elements of a data array that is to be encoded:
   generating an array of chrominance difference values that represents the difference between the chrominance values of the source block of data elements of the array of data elements being encoded and the chrominance values for a reference block of data elements derived from the chrominance values of one or more arrays of data elements in the stream of arrays of data elements;
   generating an array of chrominance value frequency domain coefficients for the array of chrominance difference values by applying a forward transformation process to the array of chrominance difference values;
   generating an array of quantized chrominance value frequency domain coefficients by applying a quantization process to the array of chrominance value frequency domain coefficients;
   determining whether the encoding of the quantized frequency domain coefficients for the luma data values for the block of the array of data elements being encoded is indicated as to be omitted; and
   when it is determined that the encoding of the quantized frequency domain coefficients for the luma data for the block of data elements of the data array being encoded is indicated as to be omitted:
   determining whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and
   when it is determined based on the property or properties of the determined quantized chrominance value frequency domain coefficients to omit the encoding of the quantized chrominance value frequency domain coefficients in the output encoded bit stream representing the array of data elements, not including data for the array of quantized chrominance value frequency domain coefficients in the output bit stream representing the encoded array of data elements.

2. The method of claim 1, further comprising when it is determined to not include data for the array of quantized chrominance value frequency domain coefficients for the block of data elements in the output bit stream representing the array of data elements, providing in association with the output bit stream, an indication to indicate that data for the array of quantized chrominance value frequency domain coefficients for the block of data elements has not been included in the output bit stream.

3. The method of claim 1, comprising:
   when it is determined that the encoding of the quantized frequency domain coefficients for the luma data for the block of data elements of the data array being encoded is other than indicated as to be omitted, including data for the array of quantized chrominance value frequency domain coefficients for the block of data elements in the output bit stream representing the encoded array of data elements.

4. The method of claim 1, comprising:
when it is determined that the encoding of the quantized frequency domain coefficients for the luma data for the block of data elements of the data array being encoded is indicated as to be omitted:
determining whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and
when it is determined based on the property or properties of the determined quantized chrominance value frequency domain coefficients other than to omit the encoding of the quantized chrominance value frequency domain coefficients in the output encoded bit stream representing the array of data elements, including data for the array of quantized chrominance value frequency domain coefficients in the output bit stream representing the encoded array of data elements.

5. The method of claim 1, wherein the property or properties of the determined quantized chrominance value frequency domain coefficients that is used to determine whether to also omit the encoding of the generated array of quantized chrominance value frequency domain coefficients for the block of data elements being encoded in the output encoded bit stream representing the array of data elements comprises:
a property or properties that is indicative of the relative significance that the quantized chrominance value frequency domain coefficients will have on the reconstruction of the block in a decoder.

6. The method of claim 1, wherein the property or properties of the determined quantized chrominance value frequency domain coefficients that is used to determine whether to also omit the encoding of the generated array of quantized chrominance value frequency domain coefficients for the block of data elements being encoded in the output encoded bit stream representing the array of data elements comprises:
a measure of the size of the determined quantized chrominance value frequency domain coefficients.

7. The method of claim 1, wherein the property or properties of the determined quantized chrominance value frequency domain coefficients that is used to determine whether to also omit the encoding of the generated array of quantized chrominance value frequency domain coefficients for the block of data elements being encoded in the output encoded bit stream representing the array of data elements comprises:
the number of non-zero quantized chrominance value frequency domain coefficients that have been determined for the block being encoded.

8. The method of claim 1, further comprising:
determining whether to also omit the encoding of the generated array of quantized chrominance value frequency domain coefficients for the block of data elements being encoded in the output encoded bit stream representing the array of data elements based also on one or more of:
the size of the block being encoded; and
a quality measure for the encoding being performed.

9. The method of claim 1, further comprising first selecting a set of encoding options to use for the data array based on the luminance data values of the data array.

10. An apparatus for encoding an array of data elements of a stream of arrays of data elements, in which the array of data elements is to be encoded as respective sets of luminance and chrominance data values, and is to be encoded as respective blocks of data elements making up the array of data elements, the apparatus comprising:
difference value generating circuitry operable to generate an array of chrominance difference values that represents the difference between the chrominance values of a source block of data elements of an array of data elements being encoded and the chrominance values for a reference block of data elements derived from the chrominance values of one or more arrays of data elements in the stream of arrays of data elements;
frequency domain coefficient generating circuitry operable to generate an array of chrominance value frequency domain coefficients for the array of chrominance difference values by applying a forward transformation process to the array of chrominance difference values;
quantizing circuitry operable to generate an array of quantized chrominance value frequency domain coefficients by applying a quantization process to the array of chrominance value frequency domain coefficients;
encoding determination circuitry operable to:
determine whether the encoding of the quantized frequency domain coefficients for the luma data values for the block of the array of data elements being encoded is indicated as to be omitted; and
to, when it is determined that the encoding of the quantized frequency domain coefficients for the luma data for the block of data elements of the data array being encoded is indicated as to be omitted:
determine whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and
to, when it is determined based on the property or properties of the determined quantized chrominance value frequency domain coefficients to omit the encoding of the quantized chrominance value frequency domain coefficients in the output encoded bit stream representing the array of data elements, not include data for the array of quantized chrominance value frequency domain coefficients in the output bit stream representing the encoded array of data elements.

11. The apparatus of claim 10, wherein the encoding determination circuitry is further operable to:
when it is determined to not include data for the array of quantized chrominance value frequency domain coefficients for the block of data elements in the output bit stream representing the array of data elements, provide in association with the output bit stream, an indication to indicate that data for the array of quantized chrominance value frequency domain coefficients for the block of data elements has not been included in the output bit stream.

12. The apparatus of claim 10, wherein the encoding determination circuitry is further operable to:
when it is determined that the encoding of the quantized frequency domain coefficients for the luma data for the block of data elements of the data array being encoded is other than indicated as to be omitted, include data for the array of quantized chrominance value frequency domain coefficients for the block of data elements in the output bit stream representing the encoded array of data elements.

13. The apparatus of claim 10, wherein the encoding determination circuitry is operable to:
when it is determined that the encoding of the quantized frequency domain coefficients for the luma data for the block of data elements of the data array being encoded is indicated as to be omitted:
determine whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and
when it is determined based on the property or properties of the determined quantized chrominance value frequency domain coefficients other than to omit the encoding of the quantized chrominance value frequency domain coefficients in the output encoded bit stream representing the array of data elements, include data for the array of quantized chrominance value frequency domain coefficients in the output bit stream representing the encoded array of data elements.

14. The apparatus of claim 10, wherein the property or properties of the determined quantized chrominance value frequency domain coefficients that is used to determine whether to also omit the encoding of the generated array of quantized chrominance value frequency domain coefficients for the block of data elements being encoded in the output encoded bit stream representing the array of data elements comprises:
a property or properties that is indicative of the relative significance that the quantized chrominance value frequency domain coefficients will have on the reconstruction of the block in a decoder.

15. The apparatus of claim 10, wherein the property or properties of the determined quantized chrominance value frequency domain coefficients that is used to determine whether to also omit the encoding of the generated array of quantized chrominance value frequency domain coefficients for the block of data elements being encoded in the output encoded bit stream representing the array of data elements comprises:
a measure of the size of the determined quantized chrominance value frequency domain coefficients.

16. The apparatus of claim 10, wherein the property or properties of the determined quantized chrominance value frequency domain coefficients that is used to determine whether to also omit the encoding of the generated array of quantized chrominance value frequency domain coefficients for the block of data elements being encoded in the output encoded bit stream representing the array of data elements comprises:
the number of non-zero quantized chrominance value frequency domain coefficients that have been determined for the block being encoded.

17. The apparatus of claim 10, wherein the encoding determination circuitry is operable to:
determine whether to also omit the encoding of the generated array of quantized chrominance value frequency domain coefficients for the block of data elements being encoded in the output encoded bit stream representing the array of data elements based on:
a property or properties of the determined quantized chrominance value frequency domain coefficients; and
also on one or more of:
the size of the block being encoded; and
a quality measure for the encoding being performed.

18. The apparatus of claim 10, further comprising:
encoding option selection circuitry operable to select a set of encoding options to use when encoding an array of data elements of a stream of arrays of data elements based on the luminance data of the array of data elements.

19. A non-transitory computer readable storage medium storing computer software code which when executing on a data processor performs a method of encoding an array of data elements of a stream of arrays of data elements, in which the array of data elements is to be encoded as respective sets of luminance and chrominance data values, and is to be encoded as respective blocks of data elements making up the array of data elements, the method comprising:
when encoding the chrominance data values for a source block of data elements of a data array that is to be encoded:
generating an array of chrominance difference values that represents the difference between the chrominance values of the source block of data elements of the array of data elements being encoded and the chrominance values for a reference block of data elements derived from the chrominance values of one or more arrays of data elements in the stream of arrays of data elements;
generating an array of chrominance value frequency domain coefficients for the array of chrominance difference values by applying a forward transformation process to the array of chrominance difference values;
generating an array of quantized chrominance value frequency domain coefficients by applying a quantization process to the array of chrominance value frequency domain coefficients;
determining whether the encoding of the quantized frequency domain coefficients for the luma data values for the block of the array of data elements being encoded is indicated as to be omitted; and
when it is determined that the encoding of the quantized frequency domain coefficients for the luma data for the block of data elements of the data array being encoded is indicated as to be omitted:
determining whether to also omit the encoding of the generated array of quantized chrominance value frequency domain coefficients for the block of data elements being encoded in the output encoded bit stream representing the array of data elements based on a property or properties of the determined quantized chrominance value frequency domain coefficients; and
when it is determined based on the property or properties of the determined quantized chrominance value frequency domain coefficients to omit the encoding of the quantized chrominance value frequency domain coefficients in the output encoded bit stream representing the array of data elements, not including data for the array of quantized chrominance value frequency domain coefficients in the output bit stream representing the encoded array of data elements.

* * * * *